United States Patent [19]

Heavey

[11] Patent Number: 5,307,001

[45] Date of Patent: Apr. 26, 1994

[54] BATTERY CHARGING METHOD AND APPARATUS

[75] Inventor: Frederick D. Heavey, St. Paul, Minn.

[73] Assignee: Dimensions Unlimited, Inc., St. Paul, Minn.

[21] Appl. No.: 878,542

[22] Filed: May 5, 1992

[51] Int. Cl.$^5$ .................... H02J 7/00; H01M 10/44
[52] U.S. Cl. ........................ 320/30; 310/20; 310/37; 310/46
[58] Field of Search ............. 320/20, 27, 30, 37, 320/39, 40, 46

[56] References Cited

U.S. PATENT DOCUMENTS

| | | | |
|---|---|---|---|
| 4,034,279 | 7/1977 | Nilsson | 320/20 |
| 4,388,582 | 6/1983 | Saar et al. | 320/20 |
| 4,639,655 | 1/1987 | Westhaver et al. | 320/14 |
| 4,746,852 | 5/1988 | Marhin | 320/20 |
| 4,755,735 | 7/1988 | Inakagata | 320/35 |
| 4,956,597 | 9/1990 | Heavey et al. | 320/14 |
| 4,961,043 | 10/1990 | Koenck | 320/21 |

Primary Examiner—Steven L. Stephan
Assistant Examiner—Thomas M. Dougherty
Attorney, Agent, or Firm—Leone & Moffa

[57] ABSTRACT

A battery charger employing the gassing point of a lead-acid battery to determine the end of charge time and voltage. A charging level sensor takes two voltage samples of a predetermined time period to determine the change in voltage rate. If the change in voltage rate exceeds a predetermined amount the batteries are considered to be gassing. The batteries are further charged for a predetermined amount of time after the gassing phase has been entered. The invention provides a load management control function to provide a safe DC charge voltage when a hall effect sensor senses a DC load. The charger is cut off if a house load is used while the battery is being charged. The charging circuit achieves different end of charge voltages depending on a user selected battery type. The battery charger is a constant voltage temperature compensated current limited charger.

18 Claims, 19 Drawing Sheets

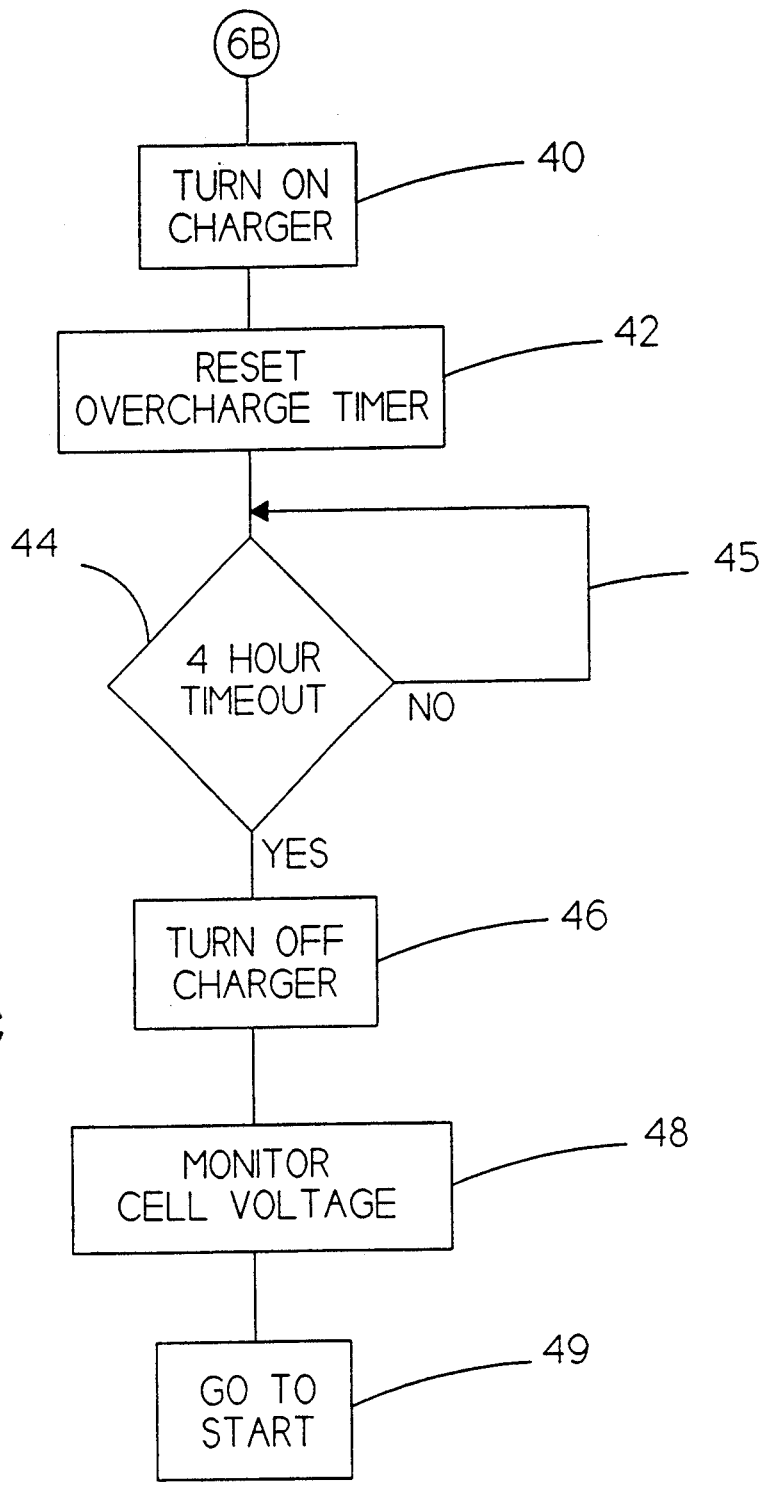
Fig_6C

BATTERY CHARGING METHOD AND APPARATUS

FIELD OF THE INVENTION

This invention relates generally to electrical charging of batteries, and more particularly to a battery charger control circuit for electrically charging lead-acid and similar types of rechargeable batteries.

DESCRIPTION OF THE ART

As set out in inventor Frederick D. Heavey's prior U.S. Pat. No. 4,956,597, issued Sep. 11, 1990, there are many practical applications for rechargeable lead-acid batteries and similar rechargeable type batteries. Besides their well known use in the transportation industry, they are commonly found in such diverse applications as powering solar homes to powering wheelchairs, and in numerous industrial, agricultural and recreational applications. The use requirements of such batteries typically demand a fairly deep discharge at a relatively high rate.

Providing a general purpose battery charger for optimizing the recharging of such batteries presents significant design problems. The batteries generally require a rapid recharge and a slight, but controlled, overcharge in order to maximize their performance. Undercharging of the battery provides less than optimum output and performance from the battery; whereas excessive overcharging of the battery can permanently damage the battery and even present safety hazards caused by, for example, boiling of the battery electrolyte.

Accurate control of the charge cycle, and particularly the overcharge, of such batteries becomes particularly important in shortening the maintenance time and lowering the maintenance cost of the battery, and in general, in extending battery life.

Accurate control of the battery charge cycle is difficult to implement in the field for a number of reasons. Each reason can significantly affect the manner in which any given battery will respond during a charging cycle. For example, the state-of-charge or discharge (i.e. 50%, 75%, 90% etc.) of the battery to be charged is typically not known. The use, age and maintenance history of the battery to be charged is also generally not known. The actual internal battery temperature, as compared to the ambient temperature, is also typically an unknown factor. Further, where a plurality of batteries are connected together to form a battery pack, it is generally not known whether each of the batteries is in the same charged condition and/or state of repair as its neighbors. This uncertainty can significantly affect the manner in which individual batteries will respond during the charging of the entire battery pack.

A practical battery charger control network should be relatively simple and inexpensive, and should be capable of rapidly bringing a battery or battery pack up to charge. The practical battery charger should also avoid excessive overcharging, while simultaneously accommodating and accounting for the above-listed battery variables and unknowns. An ideal battery charger should also have the capability of maintaining a battery's charge during extended periods of nonuse, when, for example, the battery is unused and connected to the charger for days or perhaps even weeks at a time. For these cyclical applications the ideal battery charger should also totally shut down once the battery is charged. This prevents excessive corrosion due to acid stratification.

Battery charging circuits of the prior art have been less than ideal in addressing or satisfying the above conditions. In order to simplify the charger control circuitry and therefore the cost of the battery charger, the most basic types of battery charging networks have simply used a manual On/Off charge control or have charged the battery for a predetermined time period as determined by a timer control circuit or have used a pulsed technique. Such trial-and-error charging systems could not accurately account for the actual state-of-charge of the battery. Prior art battery chargers tended to severely overcharge or undercharge the batteries being charged.

If a battery is excessively overcharged a number of undesirable effects may occur. First of all the material inside the battery may corrode due to the overcharge current hydrolyzing the water. Next, the excessive overcharging of a battery may use up water and change the total weight of the battery over a period of time. The third undesirable effect is the increase in temperature of the battery and the associated thermal stresses induced by an over temperature condition. As a general rule, the battery should not raise in temperature more than 5 degrees during charging. The charger should deliver between 105% to 115% of the energy drained during the previous discharge. An acceptable recharge rate should decrease as charging progresses due to reduced charge acceptance by the battery. One of the key performance features of a battery charger is its ability to avoid a loss of weight after a certain number of discharge/charge cycles, as, for example 36 cycles. Losing weight indicates that water is being consumed during the charging process. If during actual charging of the battery the battery does lose water the estimated lifetime of the battery will be reduced.

More sophisticated chargers have attempted to accurately control the charging operation by monitoring the actual charging voltage or rate of change of the charging voltage as a function of charging time. Referring now to FIG. 1, an unscaled graph of a current and voltage relationship for a typical battery charger over charging time 606 is shown. The charging voltage 602 and charging current 604 of a typical battery charger are illustrated as they would appear during the charging cycle of a battery. In order to effectively charge a battery, the charging voltage 602 must exceed the real terminal battery voltage at any given instant of time during the charging cycle. Further, in order to provide the desired amount of overcharge to a battery, the actual battery charging voltage $V_{chg}$ 602 must exceed the specified nominal voltage $V_{batt}$ 610 for the battery as illustrated in FIG. 1. It will be noted from FIG. 1, that the rate of change of the charging voltage $V_{chg}$ 602 decreases as the battery approaches its maximum charge. Conversely, the charging current $I_{chg}$ 604 proportionately decreases with the increasing $V_{chg}$ 602 such that the charging power delivered to the battery remains generally constant. Prior art chargers have typically either monitored the actual values of the charger voltage $V_{chg}$ 602 or have measured the rate of change of the charging voltage $V_{chg}$ 602 or the difference in the rate of change of the $V_{chg}$ 602 over time, and have turned off the charger in response to such measurements.

An alternative battery charging method known in the art measures the differential charging voltage with respect to time dv/dt. In this method the dv/dt characteristics of the battery are measured such that as the dv/dt value approaches zero the battery's state-of-charge becomes more and more difficult to sense with inexpensive sensors. The method of the prior art uses the dv/dt measurement as an indication of overcharge. The use of this method of the prior art prevents its use in battery chargers that are less complicated and cost effective.

While such prior art techniques appear sound in theory, upon closer examination they are found to be significantly inaccurate in determining the proper time at which to stop the battery charging operation, in order to optimize the amount of battery overcharge, without damaging the battery. They also are excessively expensive to produce due to the sophisticated electronics necessary to implement the required small voltage difference detection circuitry.

One problem with such prior art measurements techniques is exemplified in FIG. 2. While FIG. 1 shows the "general" relationship of $V_{chg}$ 602 over time 606, it does not accurately depict the actual length of time it takes for a typical battery to be charged from its discharged state 612 (time $t_a$) to its fully charged state 616 (time $t_c$.) This time period generally represents many hours (e.g. typically from 10 to 20 hours) for a battery having a nominal terminal voltage of, for example, 12 volts or increments thereof. In contrast, the time period that is required to "overcharge" the battery beyond its nominal charge (i.e. $t_b - t_c$) is typically a small percentage of the total battery charging time. One can readily appreciate that since the charging voltage $V_{chg}$ 602 varies only a small amount (on the order of millivolts) during the final overcharging time period, battery charging systems that monitor and measure only the change in $V_{chg}$ 602 in order to determine the end of the charge cycle, if not extremely accurate, can grossly miscalculate the actual charged state of the battery.

A more accurate manner of determining the actual undercharged state of a battery is possible by examining the physical/chemical characteristics of the battery being charged. When a lead-acid type battery is charged, chemical changes occur to the electrolyte within the battery. In particular, the specific gravity of the electrolyte gradually increases as the battery charges toward a maximum value. The maximum specific gravity value of the battery electrolyte is attained when the battery is fully charged. Just prior to attaining full charge, (i.e. as the total charge input to the battery approaches the preceding battery discharge output) there is a rapid change (increase) in the specific gravity of the battery electrolyte, toward its maximum value. At that instant during the charging cycle, the water within the battery cells electrolyzes, and gas is formed. This phenomenon can be electrically detected as a voltage rise at the battery output terminals, shown as $V_B$ in FIG. 3. For simplicity in description of that instant of time in the charging cycle of the battery, such point will generally be referred to hereinafter as the gassing point of the battery and generally occurs at the $t_b$ 614 instant of time of the charging curve of FIG. 2.

The specific gravity during the first phases of the charge cycle up to the gas point lags behind the state-of-charge of the battery. Beyond the gas point the specific gravity increases more rapidly. The specific gravity is not increasing at the same rate throughout the charge even if the ampere hours going into the battery over time is linear, so the specific gravity lags until the gas point then catches up.

Now referring to FIG. 4 which shows a graph of a gas point detector output as a function of the percentage of the state-of-charge of a battery. The data points of the graph were experimentally determined from an actual battery recharge using the apparatus of the instant invention. The graph illustrates the sharp change in GPD output at the gas point. As will be appreciated, since the change in battery voltage at the gassing point of the battery is relatively small as compared to the actual battery output voltage level, and since the change occurs over a relatively short time interval in the overall charging cycle of the battery, it is not readily detectable with the conventional prior art battery charger techniques that simply measure the battery charging voltage or the rate-of-change of the battery charging voltage.

The direct measurement of specific gravity is both time consuming and difficult. The equipment used to measure specific gravity is difficult to use and often results in errors during measurement. The full range of specific gravity values often exceed the limit of any one specific gravity tester so multiple specific gravity testers are usually required. To accurately measure the specific gravity of a battery electrolyte the temperature of the electrolyte must be known when the specific gravity is measured. For example, in solar home maintenance many temperature measurements must be made. With the advent of sealed batteries the checking of specific gravity is made extremely difficult because it is impossible to gain access to the electrolyte without destroying the battery system. There is no effective way of testing the specific gravity with a hydrometer in sealed batteries. Gelled electrolyte type batteries and absorbed electrolyte type batteries also exhibit this problem. Manual checking of specific gravity in general is not a desireable activity.

The present invention addresses the above-mentioned shortcomings of known prior art battery charging control networks, by accurately detecting the gassing point of a battery during its charging cycle and by accurately continuing to charge the battery after the battery voltage has reached an optimum charge level selected for the battery over a predetermined over-charge period. The method of the invention is used to determine the gassing point of a lead-acid battery. If a lead-acid battery is charged with a battery charger that is not voltage limited then the charging voltage will increase as the battery is charged. However, the actual voltage of the battery will be lower when measured after the charger is taken off the battery. This phenomenon occurs at different voltage levels between 80%-90% fully charged. This effect is called the back EMF effect. If the charger is disconnected the voltage of the battery will drop. Prior art gas point detection circuits put a periodic load on the battery during charging in an attempt to test for this condition. The prior art provided periodic charging periods over time.

It is therefore a motivation of the invention to provide a better way of detecting the gassing point for lead-acid battery and providing a more effective charge circuit.

BRIEF DESCRIPTION OF THE DRAWINGS

FIGS. 6A, 6B and 6C show a flow diagram of the method of the invention used to determine the gassing point of a lead-acid battery.

SUMMARY OF THE INVENTION

The invention provides a battery charger that exploits the gassing phase of a lead-acid battery under charge. When a lead-acid battery enters the gassing phase the apparent voltage is different from the measured voltage when the charger is removed. The invention measures this difference over a predetermined time period to determine that the gassing phase has actually been entered. The invention provides a sequence of nested timers that schedule and enable two sample and holds to measure the voltage at two different times. The invention also provides four voltage settings for various types of lead-acid batteries including maintenance free batteries, conventional lead-acid batteries, sealed-absorbed batteries and sealed-gelled batteries.

The invention provides a novel method of reducing the battery charger current when the environment, using the battery charger and inverter combination, demands current that exceeds the capacity of the system. This provides a load leveling technique. The apparatus also lowers the end of charge voltage within a safe predetermined level when a DC load is sensed from the environment such as house appliances or recreational vehicle appliances. The gas point detection charger apparatus of the invention changes the end of charge voltage to match the user selected switch positions.

Other objects, features and advantages of the present invention will become apparent to those skilled in the art through the description of the preferred embodiment, claims and drawings herein where like numerals refer to like elements.

DESCRIPTION OF THE PREFERRED EMBODIMENT

Figure 5A:
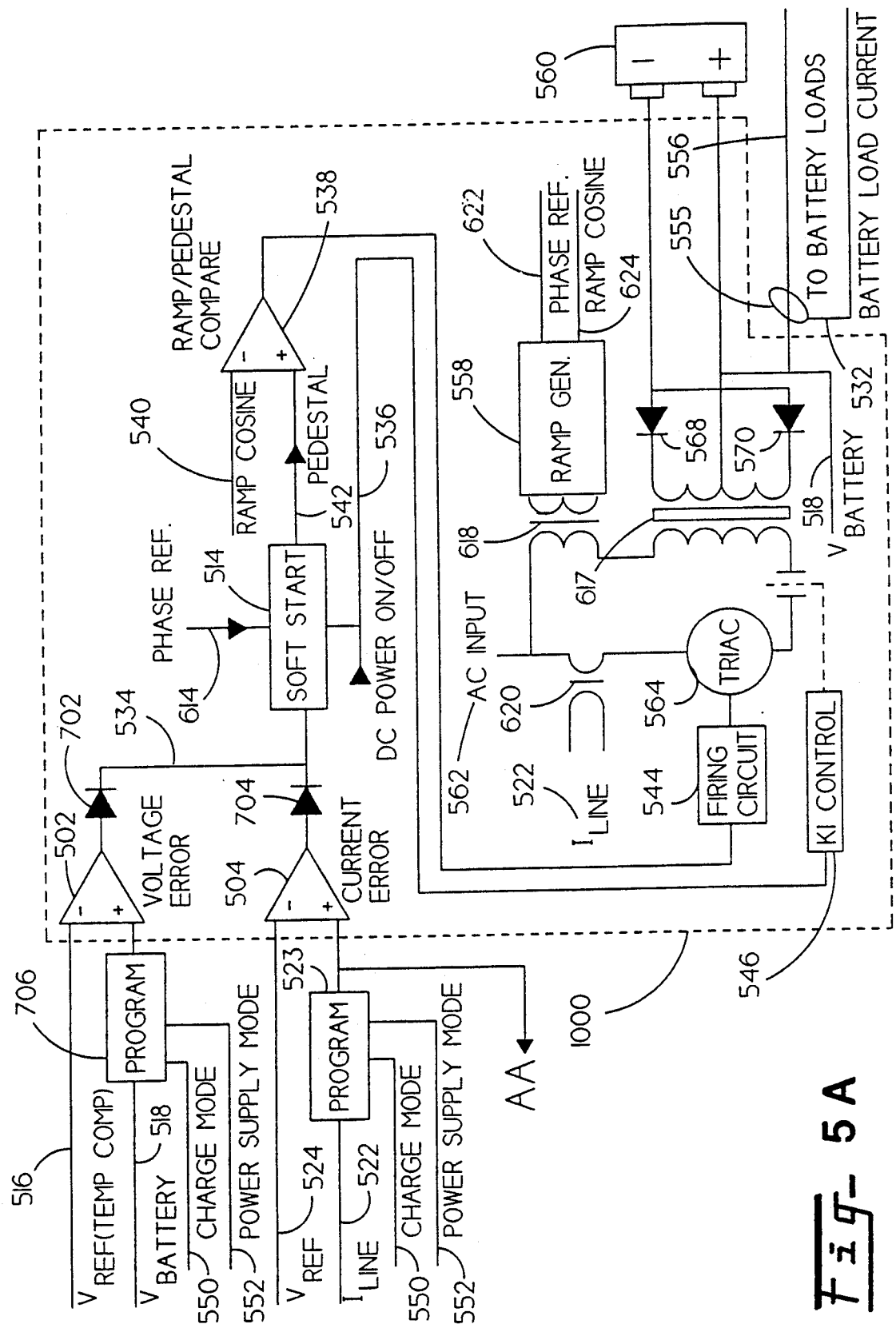
FIGS. 5A and 5B show the apparatus of the invention as a high level schematic diagram.
Figure 5B:
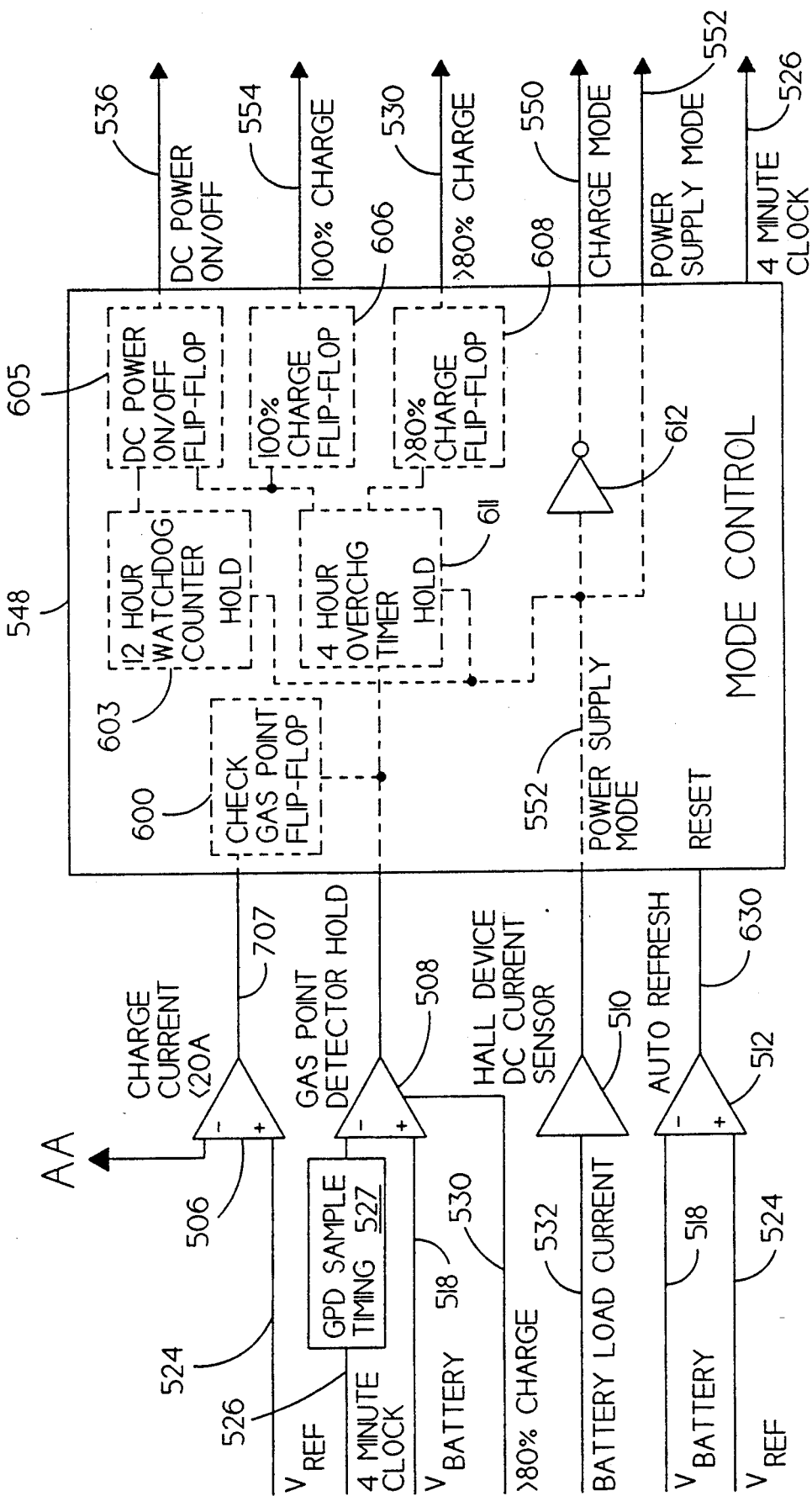

Now referring to FIG. 5 which shows a charger/-power supply high level schematic block diagram. FIGS. 5A and 5B show a battery charging circuit 1000, a gas point detection sample and hold circuit 508 and mode control logic 548, as well as auxiliary circuits. A hall effect circuit including a battery load current input 532 may be used to operate the battery charger as a power supply in a power supply mode. The hall device DC current sensor 510, is an optional aspect of one alternate embodiment of the invention and will be discussed in detail hereinbelow.

The battery charger 1000 has two error amplifiers 502, 504. A voltage error amplifier 502 senses the battery voltage signal 518 and a current error amplifier 504 senses the battery current signal 522. The error amplifiers 502, 504 are wire ored together through diodes 702, 704 thus allowing the battery charger to be either in a constant voltage mode or in a current limited mode. For example, at the beginning of charge a battery is typically fairly deeply discharged. Diodes 702 and 704 in combination with triac 564 perform as a voltage regulator and create a phase control charger.

The voltage circuit error amplifier 502 has a negative input connected to a V ref signal 516 which is temperature compensated. The reference voltage 516 is compared against the battery voltage 518 by the amplifier 502. Temperature compensation is done according to the *Society of Automotive Engineers* (SAE) Standard J 537 dated June, 1986. The aforesaid SAE specification specifies a temperature compensation curve for lead acid batteries.

Figure 11A:
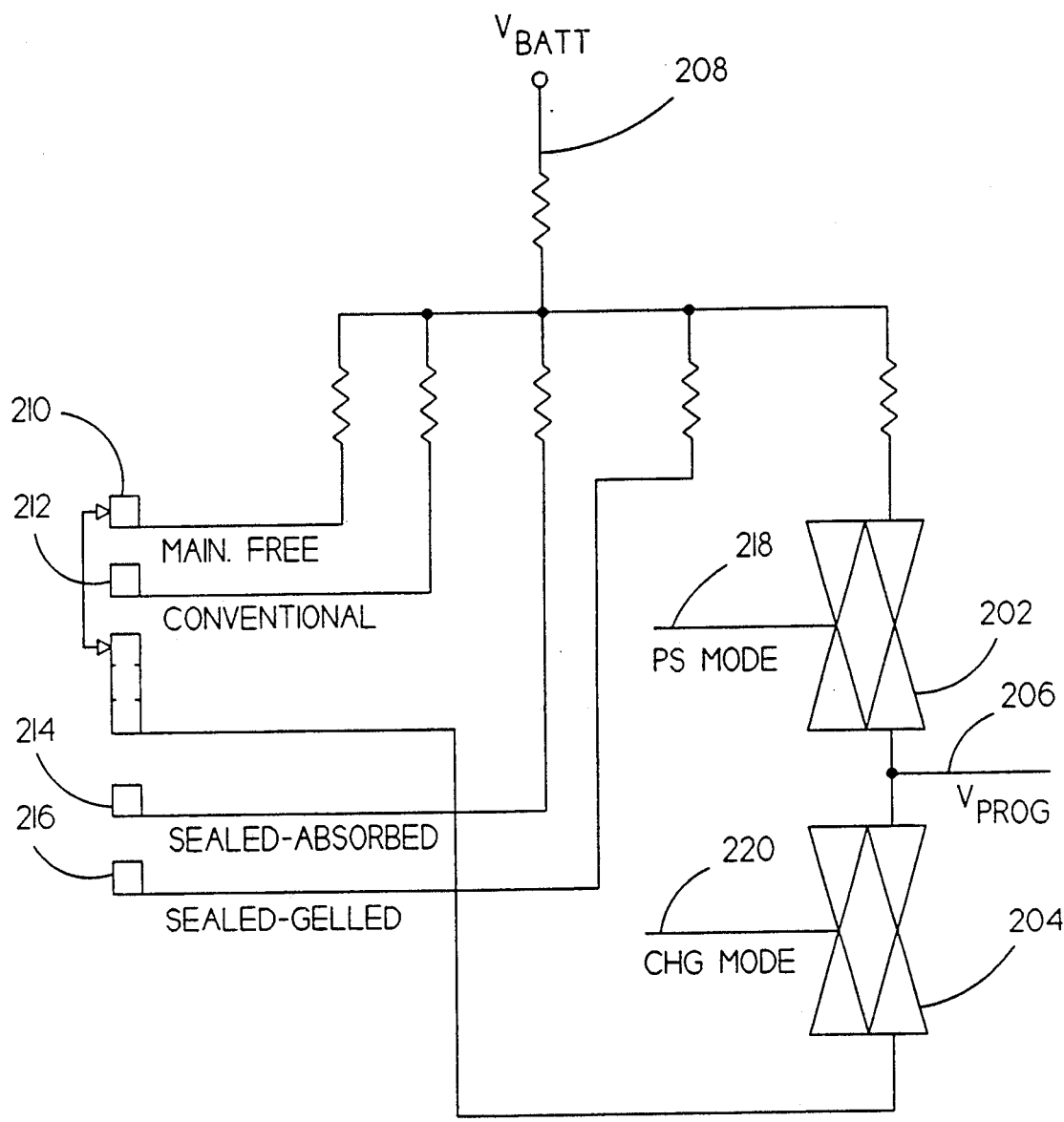
FIG. 11A shows the voltage program for the apparatus of the invention.
Figure 15:
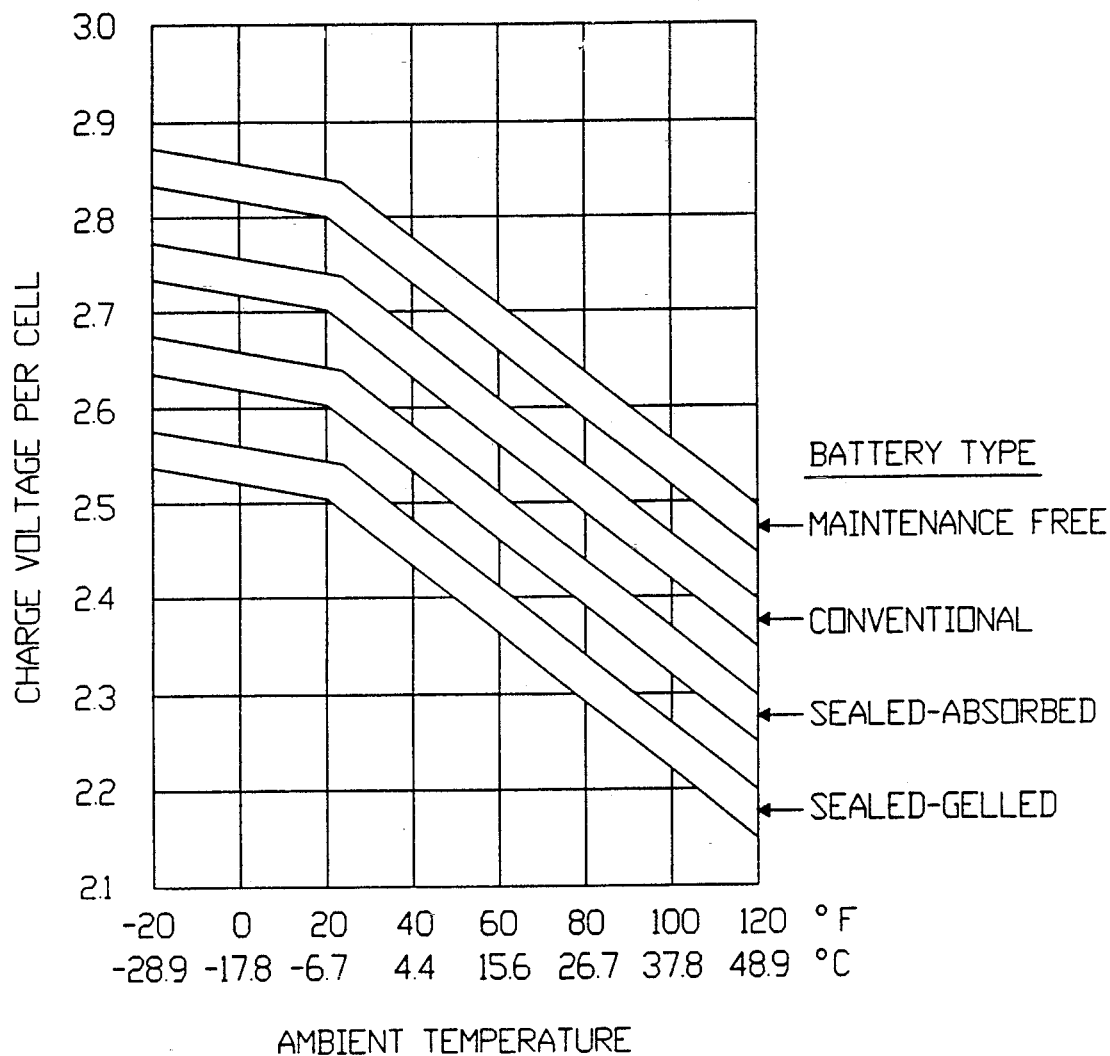
FIG. 15 graphically shows temperature compensation curves for four types of batteries.

Program circuit 706 has as an input the battery voltage 518. The program circuit 706 can be operated in charge mode in response to charge mode signal 550 or power supply mode in response to power supply mode signal 552. Programming is done by a four position switch which, in one embodiment of the invention, is implemented as a printed wiring board so that the user can select one of four different battery types. Different batteries require different end of charge voltages. The four battery types may advantageously be maintenance free, conventional, sealed-absorbed, and sealed-gelled. FIG. 15 shows graphically the temperature compensation curves with these four types of batteries and also references the SAE J537 June, 1986 standard. FIG. 11A discussed in detail hereinbelow shows an example of a voltage program circuit of the type indicated by program circuit 706.

The current error amplifier 504 has a reference input 524 and a line current input 522. A current program circuit 523 is advantageously programmable with the user specified charge mode 550 state and the power supply mode 552 state. Program circuit 523 provides a programmable over current or current error signal. The current error amplifier 504 feeds amplifier 538 to generate a ramp/pedestal compare signal to drive a firing circuit 544 into the triac 564 in a manner well known in the art.

The current error comparator 504 measures line current instead of battery current. The apparatus of the invention may limit either line or battery current. Since it is not desireable to trip an upstream AC breaker to control the charger, the apparatus of the invention provides a load level feature which limits the line current to be less than the tripping level of the AC breaker. The AC line current is monitored at all times and kept below the trip point. A BATTERY CHARGE CURRENT LESS THAN 20 AMPS comparator 506 senses the battery charge current.

A current transformer 617 is connected at one leg to an AC input line 562. A ramp generator 558, is inductively coupled to the AC line 562 to allow the triac 564 to sense the zero crossing of the AC line 562 in order to generate a ramp signal. The battery voltage 518 is sensed at the terminals of the battery 560. The battery 560 is connected to the charger through transformer 617. A BATTERY LOADS LINE 556 is connected to line 518. A BATTERY LOAD CURRENT SENSOR 555 is connected around line 556.

In one example of operating the apparatus of the invention in a boat, a storage battery may be connected to an inverter which produces AC current for appliances in the boat. However, boats and RV's not only have 120 AC loads but also 1.2 volt DC loads. A typical yacht will have 12 volt lights. Typically these lights are turned on when shore power is available. When the boat is running under shore power, the apparatus of the invention can enter the charge mode.

It is desireable to know when some loads have been turned on in the boat. For the case where the battery is charging at 15.5 volts, the system without the protection method of the invention would present a 12 volt radar system, communication system, light bulbs, or stereos, a damaging high voltage. The apparatus of the invention detects any load put on the battery and immediately makes changes in the mode control from charge mode to power supply mode to reduce the voltage.

If a DC load is also placed on the battery it is sensed by the hall sensor and all in progress charging generators are put on hold The apparatus of the invention then programs the charger to a fixed 13.8 volts in the case of a 12 volt system. 13.8 volts is the normal voltage for a 12 volt system. Some charging continues to occur even at this voltage. This is to keep the battery ahead of the applied voltage such that system capacity will be maintained. When the loads are turned off the charge cycle resumes. The charger shuts off when the charge is complete.

The auto refresh function turns the charger on to "refresh" the battery. The auto refresh function of the invention includes an auto refresh comparator 512 which receives the $V_{battery}$ and $V_{ref}$ signals 518, 524 respectively. Comparator 512 provides an auto refresh reset signal 630 to the mode control circuit 548. The auto refresh function monitors the battery at all times. If the battery drops below its typical rest voltage of 2.1 volts per cell the function will reset the charger. The charger will then turn on and go through its complete charge regime. The system always maintains the battery by keeping watch over the battery voltage.

One embodiment of the invention includes a (not shown) display panel including status LEDs or lamps. The status LEDs are controlled through an LED register in a well known manner and include a 100% charge lamp, a battery charged lamp and a charger LED lamp. During one example mode of the invention wherein the charger was turned on and the charge cycle was completed and passed, the charger is at rest and the only status lamp that will be illuminated in a status LED register (not shown) is a 100% charge lamp indicated as signal 554 controlled by a flip-flop 606. The battery charged lamp will be off. The charger LED will be off. During a discharge cycle, an inverter will provide AC to any distribution loads as shown, for example, in FIG. 13. When the power comes back so that the batteries can be charged there is a power up reset. The reset indicates that the system is going to the charge mode. The, batteries then start charging. A DC power ON/OFF flip-flop 605 activates and turns on the charger 1000 through power ON/OFF signal 536 to charge the batteries. The I-line less than 20 amp channel 707 indicates when to turn on the gas point detector through a CHECK GAS POINT FLIP-FLOP 600.

As is generally shown, the gas point detection circuit of the invention comprises a GPD sample timing circuit 527 and a gas point detection sample and hold circuit 508. A four minute clock 526 clocks into the GPD sample timing 527. The four minute clock 526 runs continuously and delivers a 30 second charger off pulse every four minutes. The GPD sample timing 527 comprises a group of nested pulses. One example of a GPD sample circuit is discussed hereinbelow with reference to FIG. 9.

In one embodiment, the 30 second charger off pulse starts the GPD sample timer sequence going. After initiation of the timing sequence there is a 1100 millisecond wait. The first counter waits 1100 milliseconds, or 1.1 seconds. Then after 1.1 seconds sample #1 timer times for 3 milliseconds. The sample #1 timer strobes sample and hold #1, and then takes a measurement of the battery after 1.1 seconds. While the charger is turned off during the 30 second charger off pulse the 1.1 second delay allows settling in the electronics to guarantee that everything is off and the battery is dropping off. An erroneous reading would be obtained at this point if the current were measured in the battery because of the $I^2R$ drops. The battery voltage drops naturally.

Figure 1:
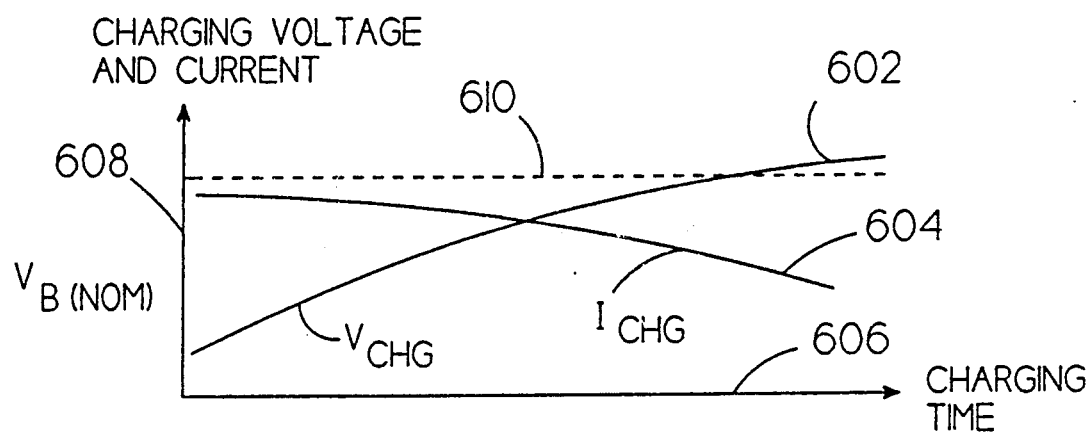
FIG. 1 is an unscaled graphical representation of charging voltage and current curves as they appear during a battery charging operation for a typical lead-acid battery.
Figure 2:
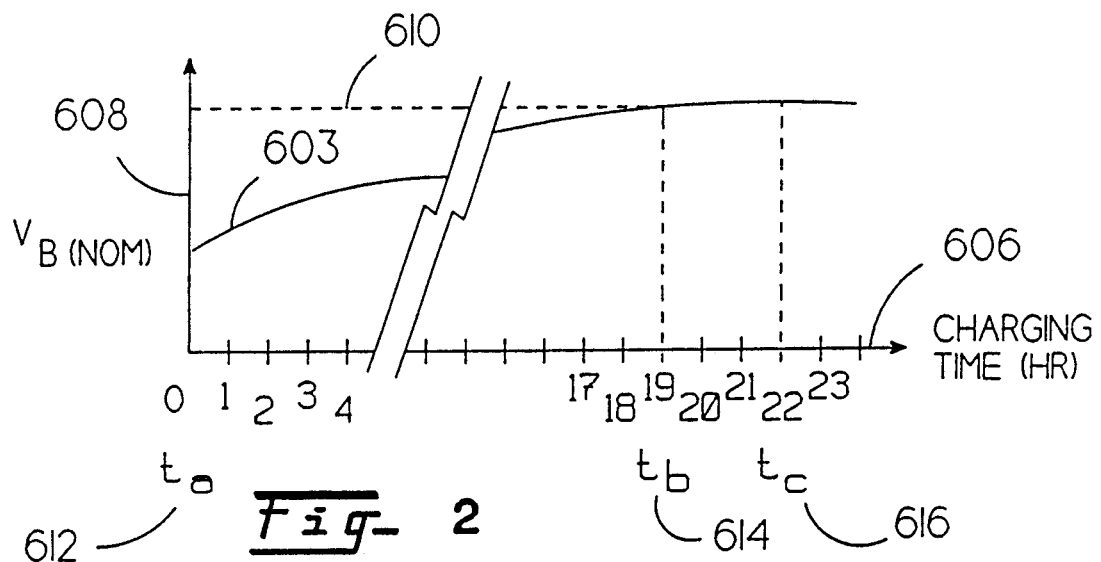
FIG. 2 is an expanded graphical representation of the battery voltage variation of a typical lead-acid type battery as it appears during a charging operation.
Figure 3:
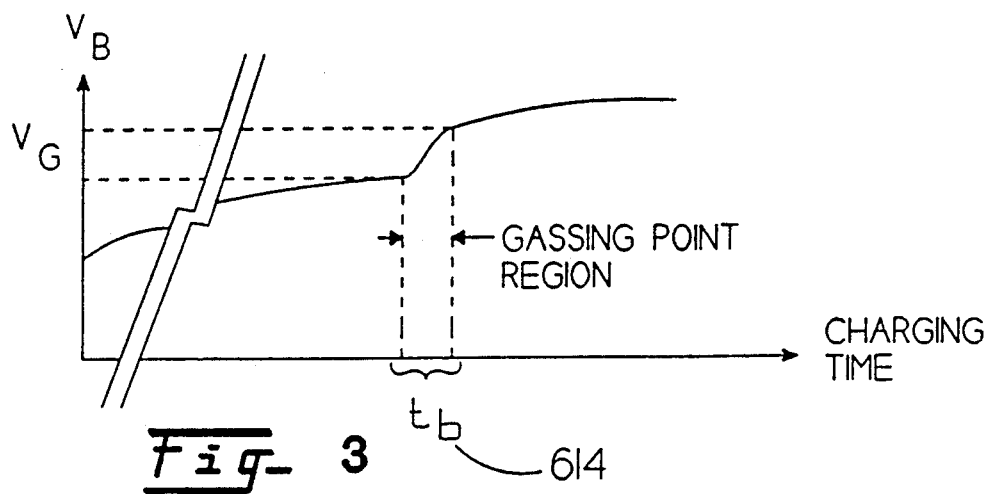
FIG. 3 is an enlarged graphical representation of the battery terminal voltage of FIG. 11 as it would appear in the gassing point region of the battery.
Figure 4:
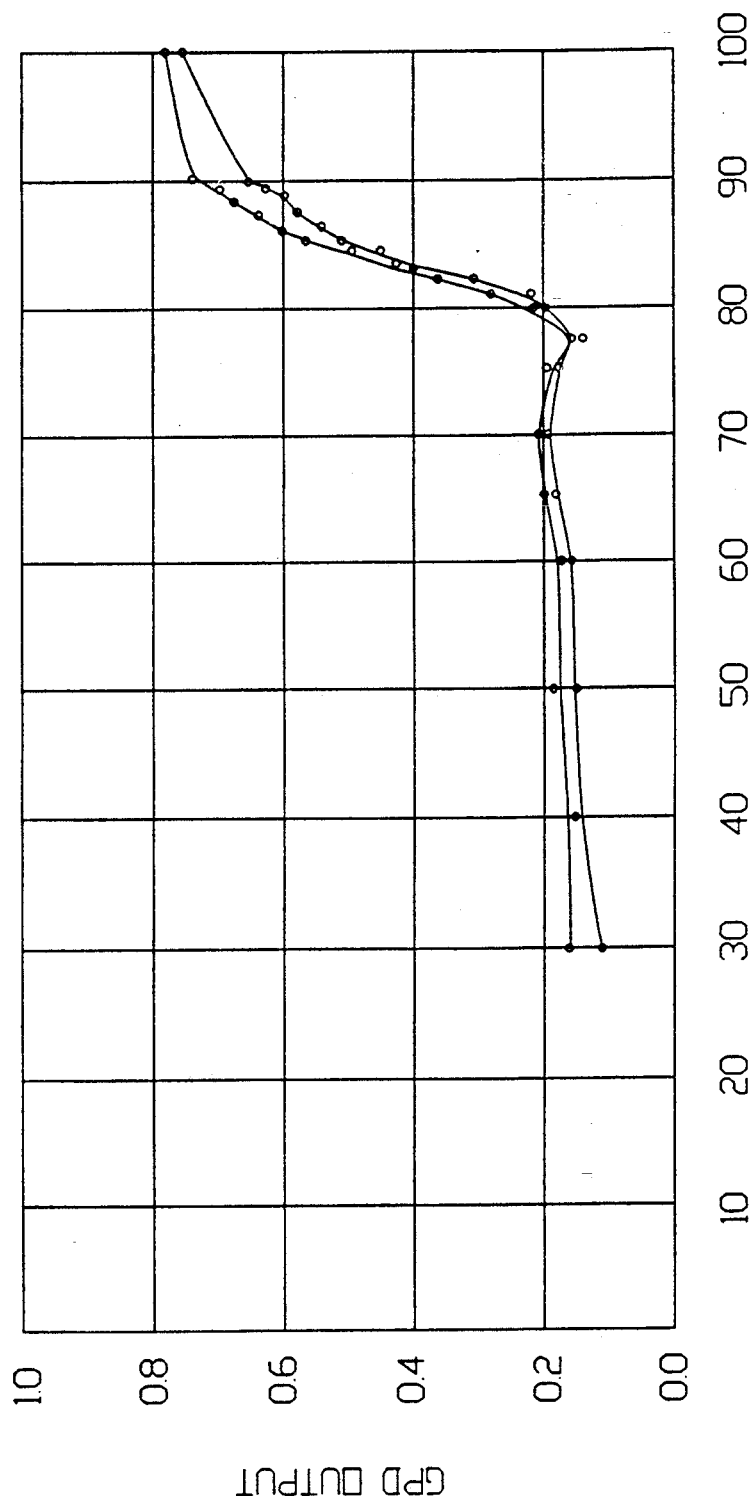
FIG. 4 is a graphical representation of a gassing point detector output as a function of the percentage of state-of-charge of a battery.

The nested sampling technique employed by the method of the invention was found empirically. It was found that at about 1100 milliseconds a 3 millisecond sample is taken. Then wait 25 seconds and sample and hold number 2 is strobed for a 3 millisecond strobe pulse. A second sample is taken one second after turning off the battery charger and another sample 25 seconds later. When those two voltages are compared a difference is computed. The voltages are compared against 400 millivolts. If the difference of the voltage is less than 400 millivolts it is not gas point, if it is more it is. So then referencing the chart in FIG. 4 showing the GPD output verses the percent state-of-charge, the gas point is determined when the GPD output begins to increase rapidly. The output from the comparator 508 is gated through to the four hour overcharge timer 611. The output is set to indicate that the gas point has occurred for four sample cycles. The >80% charge flip-flop 608 will be enabled providing >80% CHARGE signal 530. The gas point detector 508 will be disabled. The four hour timer 611 continues to run. The timer 611 will specify the overcharge. The overcharge time is based on the size of the batteries being charged and the size of the charger.

A 12 hour watch dog timer 603 runs continuously in case there is a malfunction, such as may be caused by a shorted cell, tampering with the battery connections during charge, or other unanticipated conditions. The timer runs independently and shuts off the battery charger, after 12 hours by operating the DC POWER ON/OFF flip-flop 605 unless the charger was previously turned off by another function signal. For example, at the end of the four hour charge the 80% light goes out, the 100% light comes on and the charger shuts off. The system stays in this mode until something else is requested.

When the four hour timer 611 times out it resets. When the charger is off, all the timers/counters are reset to zero. The system is then waiting in 100% charge mode waiting for auto refresh.

When a load is placed on the battery a load detect module places the system into power supply mode. The charger turns on in power supply mode for as long as the load is present. The load has to be at least one amp in order to trigger a switch to the power supply mode. When the load is removed the charger goes back to the 100% charged state. The system does not initiate a charge cycle, it does not initiate another four hour overcharge, it goes back to 100% charge. A load coupled with AC power does not take any capacity out of the battery. The power is essentially not coming from the battery, it is coming from the battery charger which is now in a power supply mode. The charger provides a constant voltage. In the case of a 12 volt charger, for example, a full 100 amperes DC is available to support the load while the battery remains fully charged.

Figure 16:
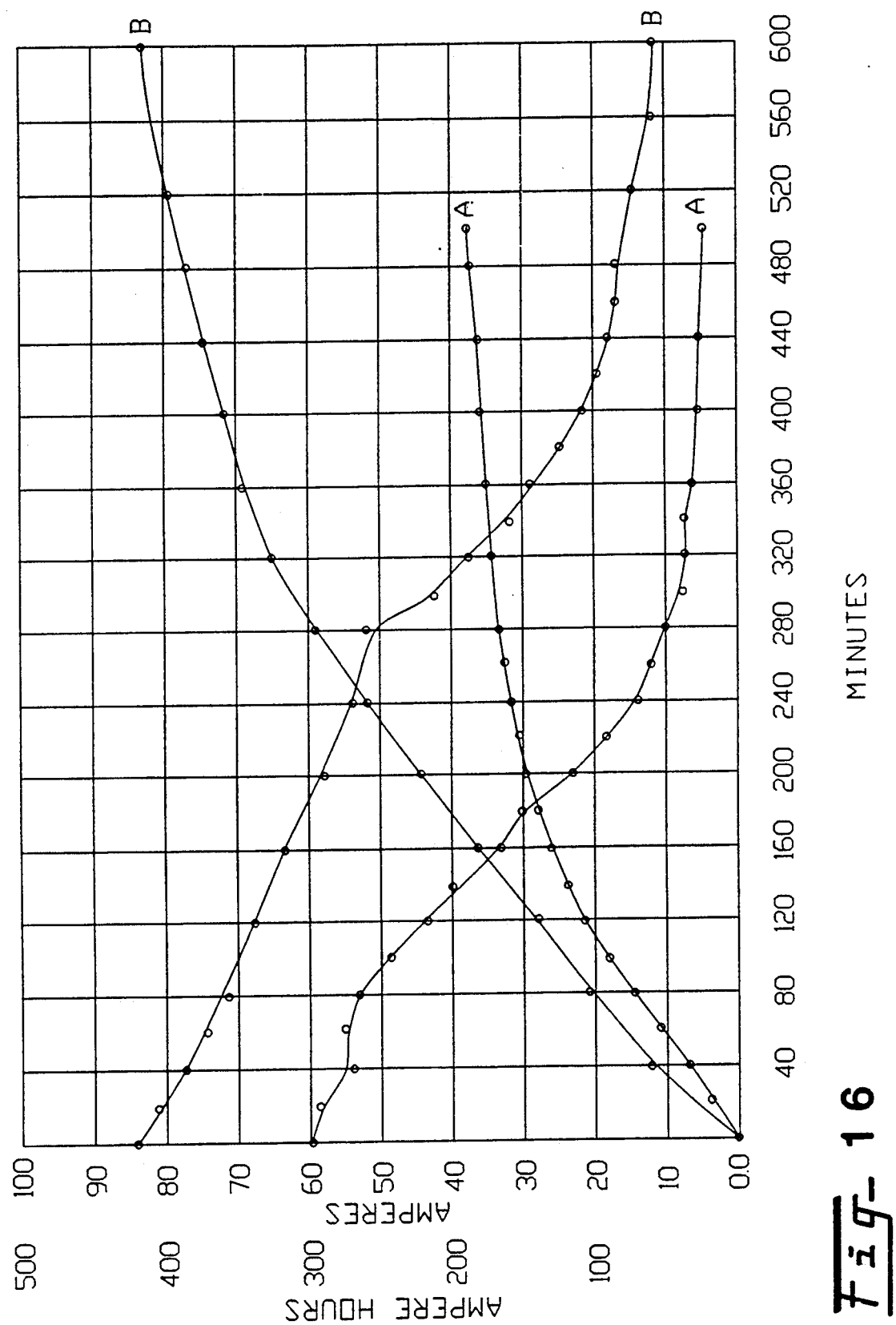
FIG. 16 shows ampere time characteristics of the charger apparatus of the invention.

Now referring to FIG. 16 which shows ampere time characteristics of the charger apparatus of the invention. FIG. 16 shows a graph of the actual performance of the charger against a battery shown by curve A and two batteries shown by curve B. Curve 1601 is a plot of amperes dropping as battery A reaches a 100% percent charge condition. Similarly, curve 1602 is a plot of amperes dropping as battery B approaches a 100% state-of-charge. Curves 1603 and 1604 respectively are plots of ampere hours over time stored into batteries A and B respectively as the batteries are charged. The chart shows the ampere hours going back into the battery slowly, and also the amperes dropping as the battery reaches 100% charge. The amount of charge current a battery should experience is proportional to the size of the battery. One principal employed by the invention takes advantage of the very dramatic change in electro-chemistry which occurs towards the end of the charging cycle. This effect is known to occur consistently at close to 80% of charge if the battery is charged according to the well-known Ampere-Hour law. That is, the charge rate in amperes is kept below a value equal to the number of ampere hours to be returned. For example, if 50 ampere hours of capacity is yet to be returned, the charge rate could be high as 50 amperes. If 10 ampere hours remain to be delivered to the battery, the rate may be reduced to no more than 10 amperes. Using this law, a given charger can be characterized and rated for a range of battery ampere hours. Thus, the 80% point is predictable. For example, a 100 ampere hour battery should be charged at an average rate of C/5 or 20 amperes up to 90%, dropping to C/10 or 10 amperes to 100% and finishing at C/25 or 4 amperes to 105%–115%.

Figure 6A:
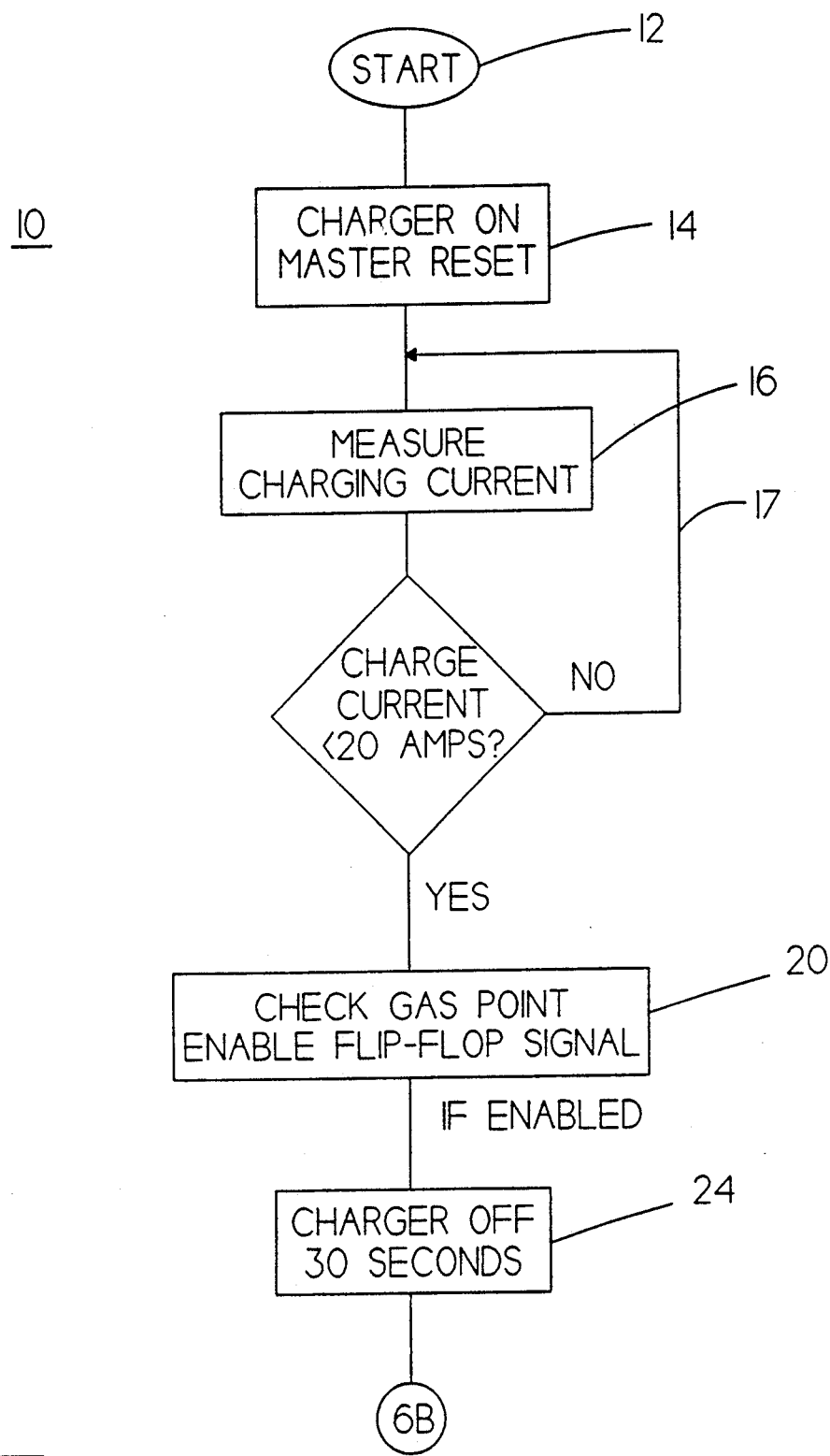
Figure 6B:
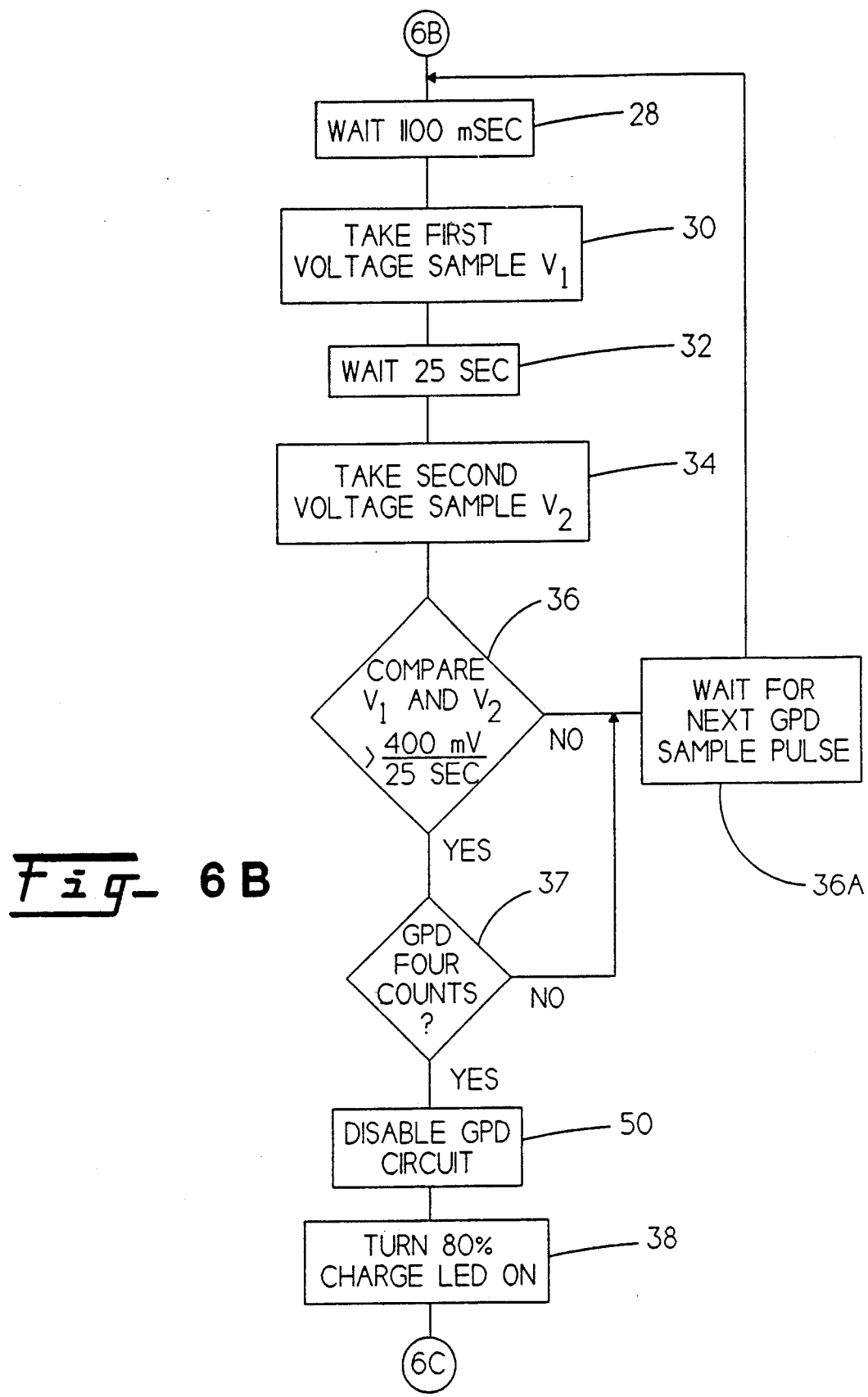

Referring now to FIGS. 6A, 6B and 6C which are intended to be read pieced together as a single sheet and which show an example of the gas point detection battery charging method of the invention's process flow diagram. The gas point detection process begins in process step 12 with the initiation of the battery charging system. Upon initiation the battery charger is soft started in process step 14. The invention provides a soft start circuit 514 as shown in FIG. 5A and soft stop of the battery charger that ramps up the charge current to the battery smoothly.

The process then flows to measure the charging current in process step 16. The gas point detection process then flows to step 18 which checks to see whether the charge current is less than 20 amps DC, if it is not the process returns through process arrow 17 to process step 16 to continue to measure the charging current. If the charging current is less than 20 amps DC the process flows to process step 20 where the gas point flip-flop 600 is checked for an output enable signal. If the gas point flip-flop output is enabled, the process then flows to step 24 where the charger is turned off for 30 seconds. If the gas point flip-flop output is not enabled, the process waits at step 20 until an enable signal is received.

The process then flows to step 28 to wait 1100 milliseconds while the charge circuitry settles down. Those skilled in the art will recognize that for various implementations of the apparatus of the invention the time required to wait for the charge circuit to stabilize may vary.

The process then flows to step 30 first to take a first voltage sample of the battery $V_1$. The first voltage sample $V_1$ is stored for a later comparison. The process then flows to step 32 to wait 25 seconds before taking another sample. Those skilled in the art will recognize that the 25 second wait time could vary depending on the type of battery being recharged and that the 25 second sample is taken in this embodiment of the invention as an example and not a limitation.

The process then flows to step 34 where a second voltage sample from the battery is taken and stored in voltage sample $V_2$. The process then flows to step 36 to compare the two voltages $V_1$ and $V_2$. If the difference in two voltage samples is greater than 400 millivolts per 25 seconds, the battery will be defined as being in the gassing phase. If the difference in voltage samples is less than 400 millivolts per 25 seconds the battery is defined as not to be in the gassing phase. If the comparison in process step 36 indicates either a greater than 400 millivolts per 25 seconds measurement or a measurement equal to 400 millivolts per 25 seconds the battery is defined as being in the gassing phase and the process flows to step 37. If the test fails, the process branches to step 36A where it waits for the next GPD sampling pulse from the four minute clock 26. When it receives the 30 second sampling pulse, called the charger off pulse hereinabove with reference to FIG. 5, the process restarts at step 28.

At step 37 a determination is made as to whether the gas point has been detected multiple times in the current cycle, if it has the process flows to step 50. In one example of the invention the gas point must be detected four times before leaving the gas point detection process. If four counts have not been measured, the process may return to step 36A to obtain another sample. As discussed hereinabove with reference to FIGS. 5A and 5B, the output from the comparator 508 is gated through to the four hour overcharge timer 611. The output is set to indicate that the gas point has occurred for four sample cycles. At step 50 the gas point detection apparatus is disabled. At step 38, the >80% charge flip-flop 608 will be enabled providing >80% CHARGE signal 530 and the gas point detector 508 will be disabled. If the required number of gas point detection counts have not been reached, the gas point gas point detector remains enabled.

Step 38 turns on an 80% charge indicator light. The process then flows to step 40 which turns the charger back on. The process then flows to step 42 to reset an overcharge timer. The process then flows to step 44 to execute a four hour time out in which the battery will be charged at the voltage for four additional hours. The process continues to loop through step 44 until the four hour time out has occurred. The process then flows to step 46 to turn off the battery charger. The gas point detection process then flows to step 48 to monitor the cell voltage in the battery.

While monitoring the cell voltage in step 48 the process will return to step 14 to recharge the battery and execute the gas point detection method of the invention once again if the voltage drops to less than 2.1 volts per cell.

Those skilled in the art will recognize that the gas point detection method of the invention can be implemented in a number of different forms including discrete hardware including logic and analog components or in a microprocessor using an analog to digital converter. The gas point detection algorithm may be embodied in a software algorithm implementing the various steps of the gas point detection process of FIGS. 6A, 6B and 6C.

Figure 7:
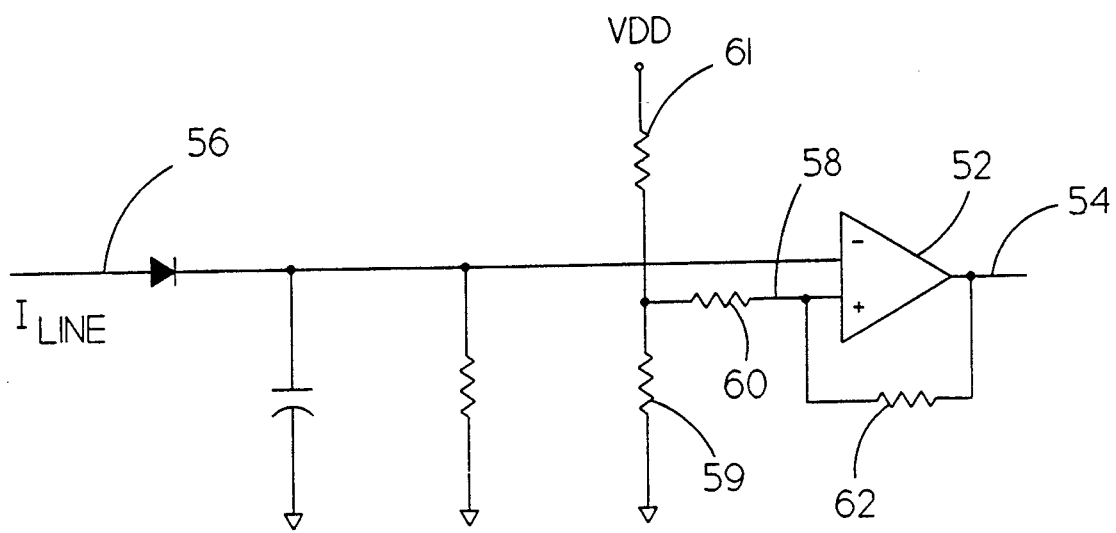
FIG. 7 provides an apparatus to sense the supply current for the gas point detection method of the invention.

Now referring to FIG. 7 which shows a method and apparatus of detecting and measuring the charging current to determine whether or not the charging current is less than 20 amps DC. The DC current sample line 56 which has been rectified from the AC component of the charging voltage, is compared to a reference voltage 58 provided by resistor network 59 through 62 by comparator 52. The gas point enable circuit of FIG. 7 provides a logic signal 54, called "<20A", which indicates that the gas point detection circuitry is enabled. Those skilled in the art will recognize that this gas point detector enable circuit could be used to enable a microprocessor based gas point detector controller. In one preferred embodiment of the invention the gas point detector enable signal 54 is used as one input to mode control logic circuitry one example of which is discussed with reference to FIGS. 10A and 10B which sh below.

Figure 8:
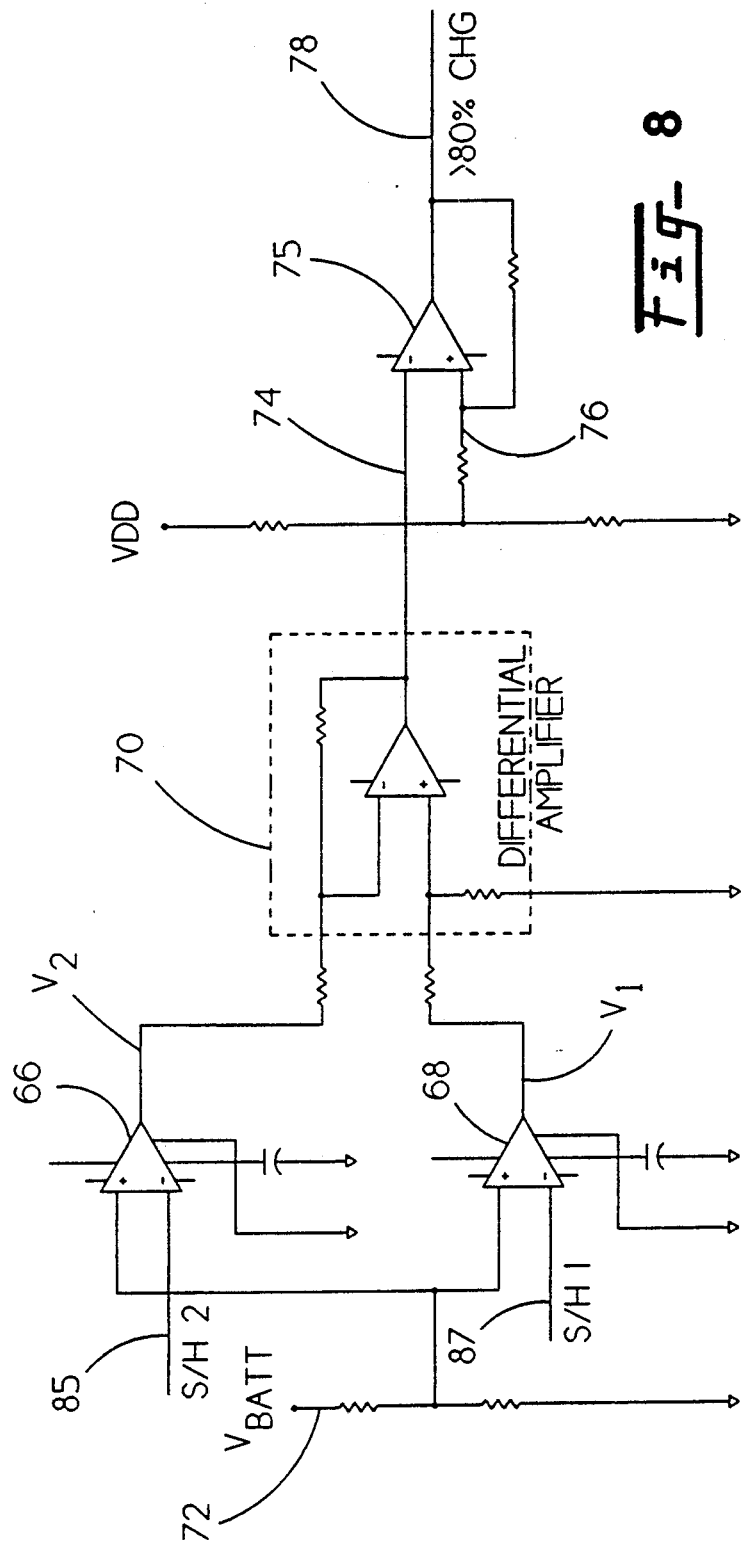
FIG. 8 shows a battery state-of-charge circuit.

Now referring to FIG. 8 which shows one example of the method of detecting the battery state-of-charge for the gas point detector method and apparatus of the invention. The apparatus of FIG. 8 implements a dual sample and hold apparatus. The voltage from the battery 72 is connected to the input of two sample and holds. Sample and hold 68 measures the first measurement of the first time period shown in FIG. 6B as the voltage $V_1$. Sample and hold 66 provides the voltage $V_2$ shown in FIG. 6B. The two voltages $V_1$ and $V_2$ are sent to a differential amplifier 70 which provides a differential voltage signal 74 to a analog comparator 75. The analog comparator 75 compares the differential voltage 74 to a 400 millivolt reference 76. The output of the analog comparator 75 is provided on the gas point signal line 78. The battery state-of-charge circuit is closely synchronized with the battery test sample nested timing sequence of FIG. 9.

Figure 9:
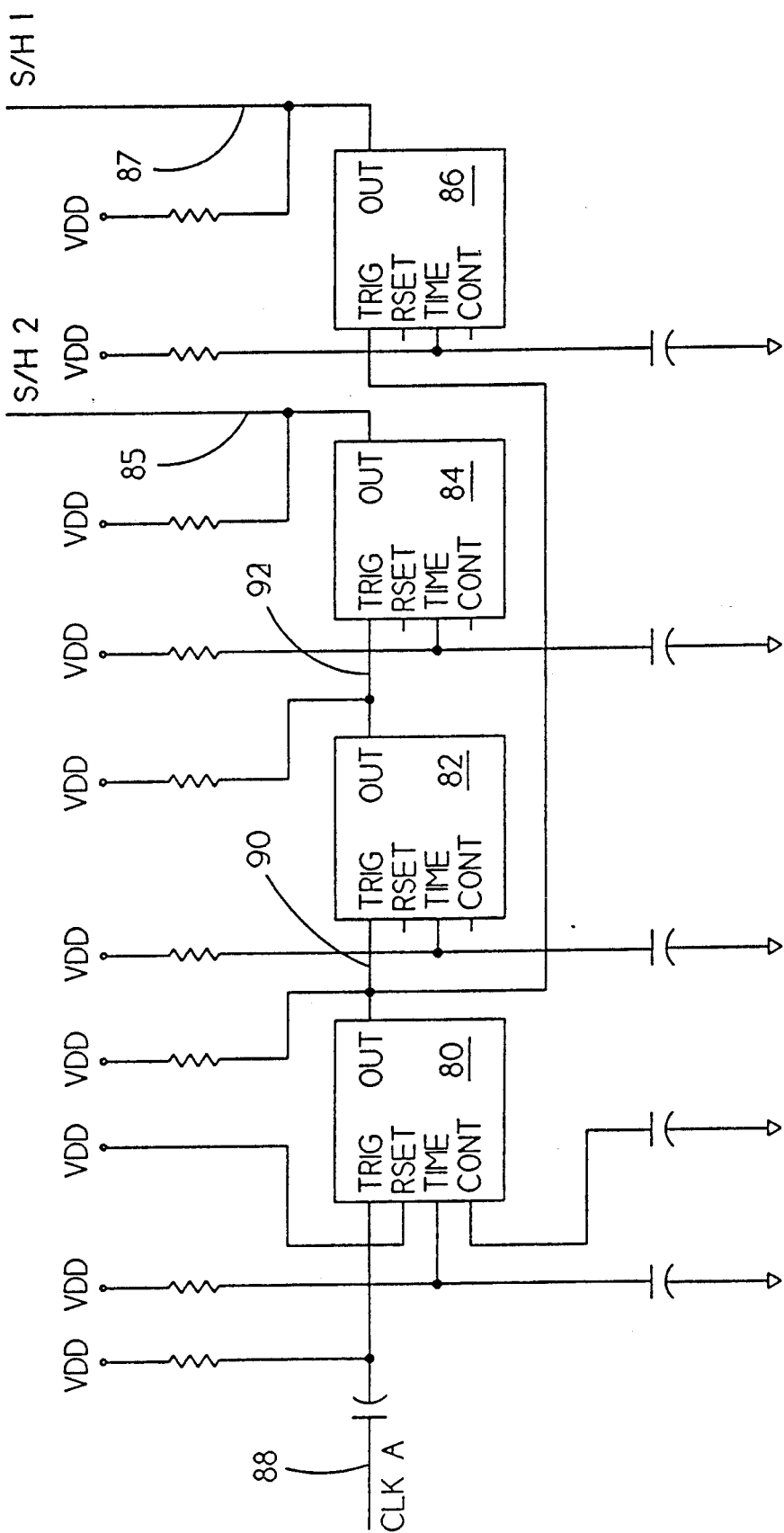
FIG. 9 shows a nested timing sequence for the gas point detection apparatus of the invention.

Referring now to FIG. 9 which shows the battery test sample gate nested timing sequence apparatus of the invention. FIG. 9 shows four countdown timers 80, 82, 84, 86 counting out the various timing sequences of the invention. The first countdown timer 80 provides an 1100 msec delay. The second countdown timer 82 provides a 25 second delay in response to an output from timer 80. Countdown timers 84 and 86 each provide 3 msec sampling intervals. When the battery test sample gate senses a "sample is requested" signal which is the 30 second charger off pulse discussed hereinabove with reference to FIGS. 5A and 5B, transmitted on signal line 88, the first timer 80 triggers and waits 1100 milliseconds before providing a delayed signal on line 90. The output of the first timer goes both to the 100 millisecond timer 82 and the three millisecond timer 86. The three millisecond timer 86 will provide a sample and hold output signal enable on line 87. The 25 second timer 82 will delay the propagation of the sample signal 90 by 25 seconds. The output of the 25 second timer 82 appears on signal line 92 which is connected to timer 84 to provide a three millisecond sample period for sample and hold enable line 85.

The nested timing sequence of FIG. 9 implements the predetermined delays, the 3 millisecond sample interval for sample and hold one 87, and the three millisecond sample time for sample and hold two 85. Those skilled in the art will recognize that the nested timing sequence timers of FIG. 9 could be implemented in a microprocessor based timer that can be used to enable the gas point detection algorithm.

Figure 10A:
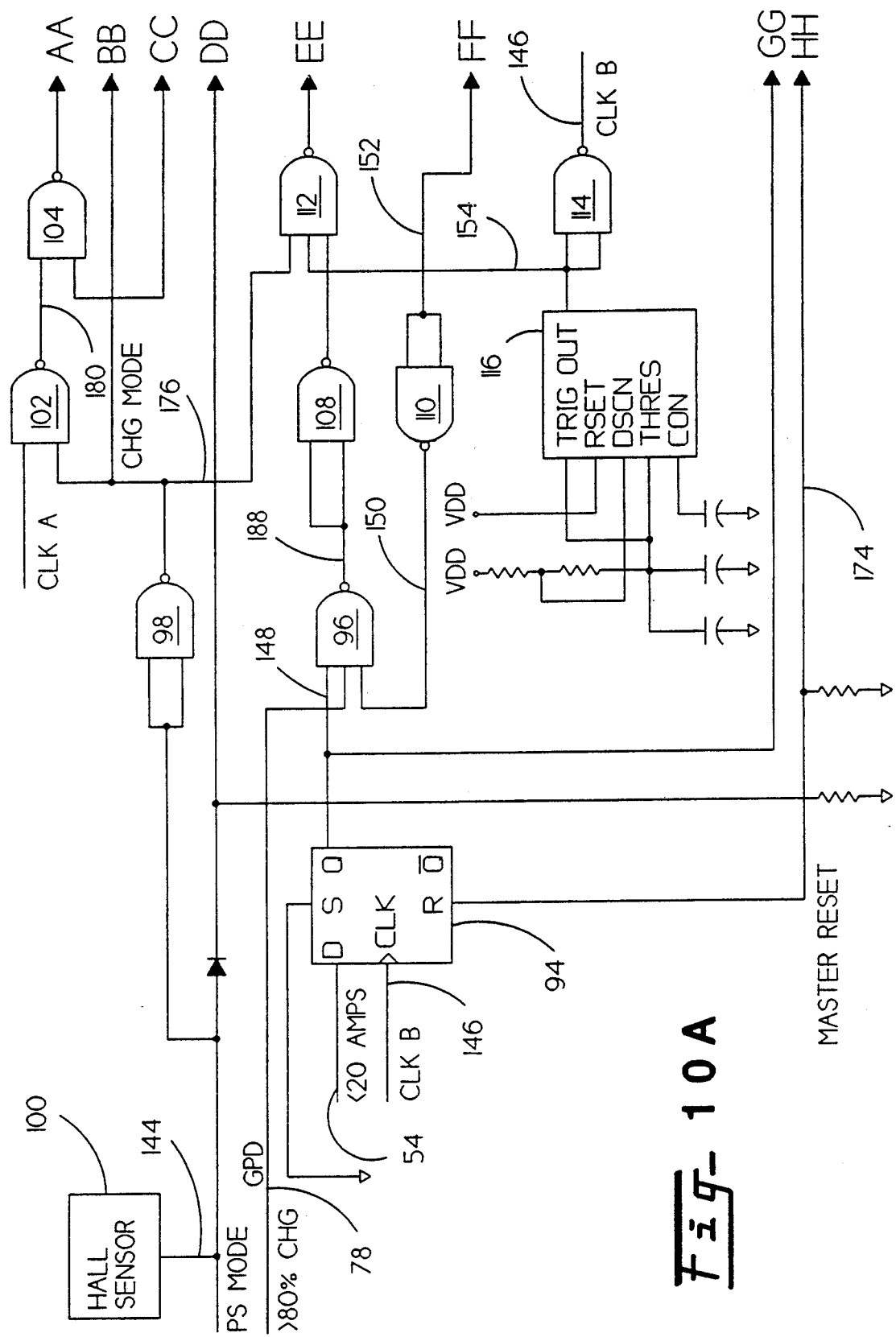
FIGS. 10A and 10B shows the mode control logic for the gas point detection method of the invention.
Figure 10B:
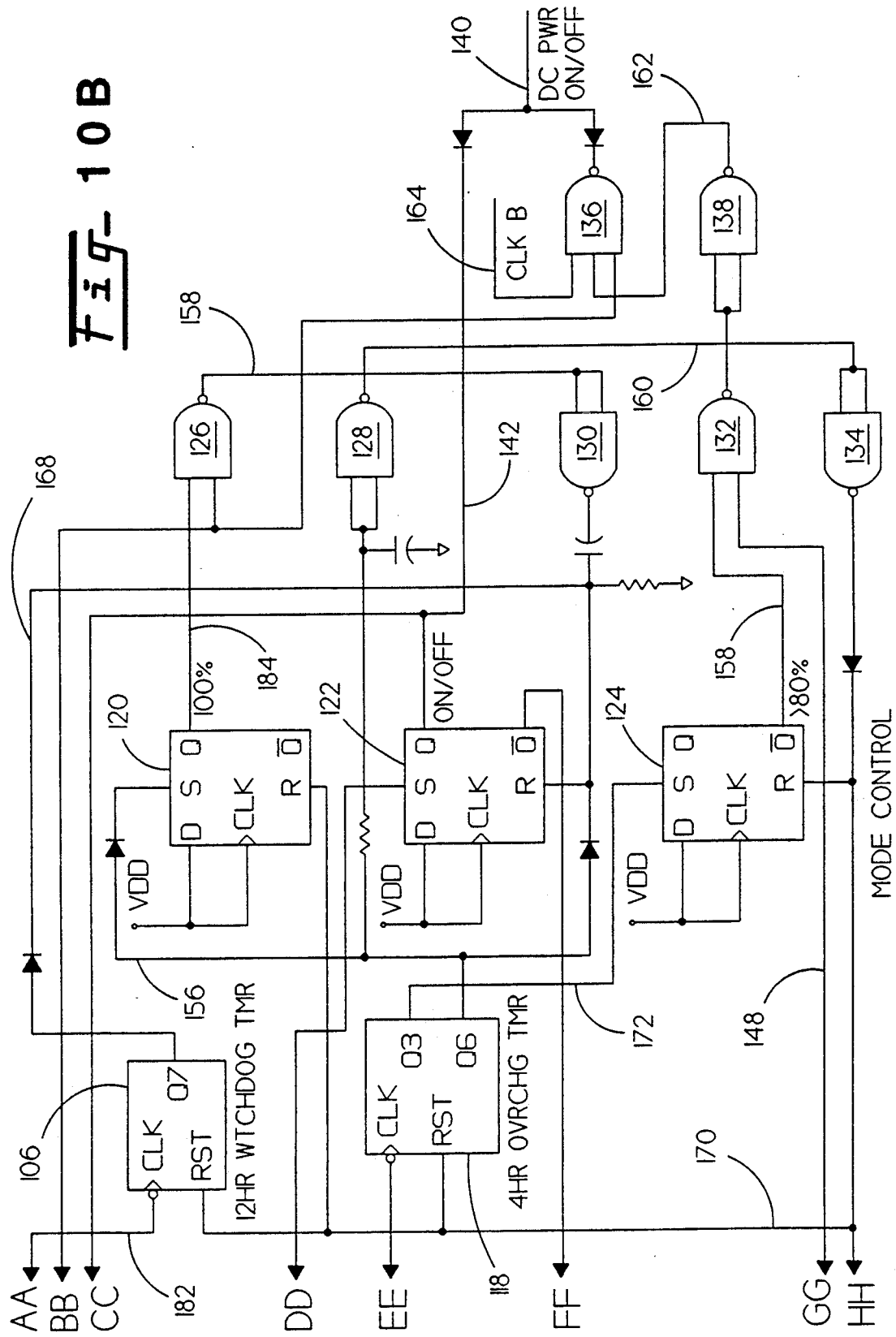

Now referring to FIGS. 10A and 10B which shows one detailed embodiment of the invention used to implement the mode control and timing of the gas point detection method of the invention shown in FIGS. 5, 6A, 6B and 6C. FIG. 10 show the method of operating the gas point detection battery charging apparatus in either a power supply mode or a charging mode. The power supply mode is indicated by a hall effect sensor 100 on signal line 144. One type of hall effect sensor is disclosed further below with reference to FIG. 13. The power supply mode is provided to switch the output of the battery charging system to a safe voltage level in the instance a DC demand is made on the battery while the battery is being charged. In other charging cases the circuit is in the charge mode. The power supply mode is provided by inverter 98 on signal line 176. The charge mode signal 176 is provided to a NAND gate 112, a NAND gate 126, a NAND gate 136, and a NAND gate 102. The charge mode controls the clocking of a 12 hour watch dog timer 106 through two NAND gates 102 and 104. The charge mode signal 176 provides NAND gate 102 along with clock A a signal 180 to NAND gate 104 which provides the clock signal 182 to a 12 hour watch dog timer 106. The function of the 12 hour watch dog timer 106 is to provide a watch dog reset 168 in case the charger has been on longer than 12 hours. The watch dog timer accomplishes the reset by activating reset by line 174 the master reset line. The charge mode signal 176 is also provided to NAND gate 126 which provides a reset signal to an RS flip flop 122 providing the ON/OFF signal 142 for one side of the DC power ON/OFF signal 140. NAND gate 126 is also provided with the output of the RS flip flop 12 which is the output of the 100% charge signal line 184. The output of the NAND 126 provides a signal 158 which resets the ON/OFF RS flip flop. The charge mode is also provided to a NAND gate 112 which provides the clock signal for the four hour over charge timer 118.

The gas point detection signal 78 which is provided by signal line 78 is fed to a three input NAND gate 96 which provides an output signal 188 which indicates the logical NAND of the gas point detection signal and the <20 amp signal 54 and the ON/OFF signal 150. The <20 amp signal 54 is provided by the gas point detector enable signal in FIG. 7 as signal line 54. The signal line 54 is fed to a RS flip flop 94 which is clocked on clock 3 146 which is provided by inverter 114 from eight minute master clock 116. The RS flip flop 94 provides a clocked <20 amp signal to line 48 at the precise time that the eight minute master clock provides an output signal on signal line 54 to NAND gate 112.

The output of the NAND gate 96 provides a logical NAND of the two primary signals of the invention the gas point detection signal 78 and the less than 15 amp signal 54. The <20 amp signal 54 indicates that the gas point detection circuit should be activated. The gas point detection signal 78 indicates that the battery is currently in the gassing phase.

The gas point detection intermediate signal line 188 is then inverted by inverter 108 and is provided to NAND gate 112 which is also senses two other inputs. One of the inputs is from the charge mode signal 176 which is clocked by clock 154 (also labeled CLK A). The gas point detection signal is used to clock the four hour over charge timer 118. When the gas point detection signal clocks the timer 118 the timer begins counting a four hour over charge. The timer 118 is connected also to the master reset line through line 170. The timer also provides two outputs, one an 80% charge output on line 172 and the other a 100-% charge output on line 156. The 80% charge output line 172 will go active when the gas point detector indicates the battery is in the gassing phase. The 80% charge signal 172 is sent through RS flip flop 124 to provide NAND gate 132 with an upgraded 80% signal 158. This signal is used along with the output of the 15 amp clock 3 signal as it enables the output of the 80% signal through inverter 138 to signal line 162 through NAND gate 136 which also receives an input from the charge mode NAND gate 136. This provides the other half of the DC power charge ON/OFF signal which is used to maintain the charge ON on the condition that the 80% signal is valid and the system is currently in the less than 20 amp mode and that clock 3 is running.

The 100% charge output of the four hour over charge timer 118 is provided to a number of devices. The RS flip flop 120 is provided the 100% charge signal 156 which then provides a 100% charge signal on signal line 184. The charger ON/OFF signal 142 is provided through RS flip flop 122. The 100% charge signal 156 is also provided to inverter 128 to provide a master reset.

Now referring to FIG. 11A which shows the voltage program apparatus of the invention to choose the programmed voltage. The apparatus of the invention provides a method of charging four types of lead-acid batteries. The first type is the maintenance free battery. The second type is the conventional battery that needs periodic replacement of water. The third type is the sealed-absorbed battery, and the fourth type is the sealed-gelled battery. Each of these batteries have a different end of charge voltage associated with them. The curves of FIG. 11B show the different end of charge curves for varying temperatures and battery types.

FIG. 11A shows a voltage program used to select between various end of charge voltages in response to user switches. A power supply mode signal 218 and a charge mode signal 220 is provided to switch the programmed voltage mode to a power supply level instead of an end of charge level when a DC user load is sensed. The power supply mode select line 218 is used to control an analog switch 202 which provides the V program line 206 with the proper program voltage based on the selection of the power supply mode select line 218. The analog switch 202 will switch in a voltage provided by resistors R60-R64 through switches 210, 212, 214 and 216. The charge mode select line 220 indicates that the V program voltage 206 should be one of the selectable charge mode voltages. The charge mode voltage corresponds to the temperature compensated voltage based on which battery is selected by the user through battery select switch 210 for the maintenance free battery, battery select switch 212 for the conventional battery, battery switch 214 for the sealed-absorbed battery, and battery switch 216 for the sealed-gelled battery. The charge mode voltage select line 220 directs that the battery be charged at the prescribed end of charge voltage following the voltage curves of FIG. 11B. In either the case of the charge mode or the power supply mode the V program voltage 206 provides the voltage program of the charging circuit.

Figure 11B:
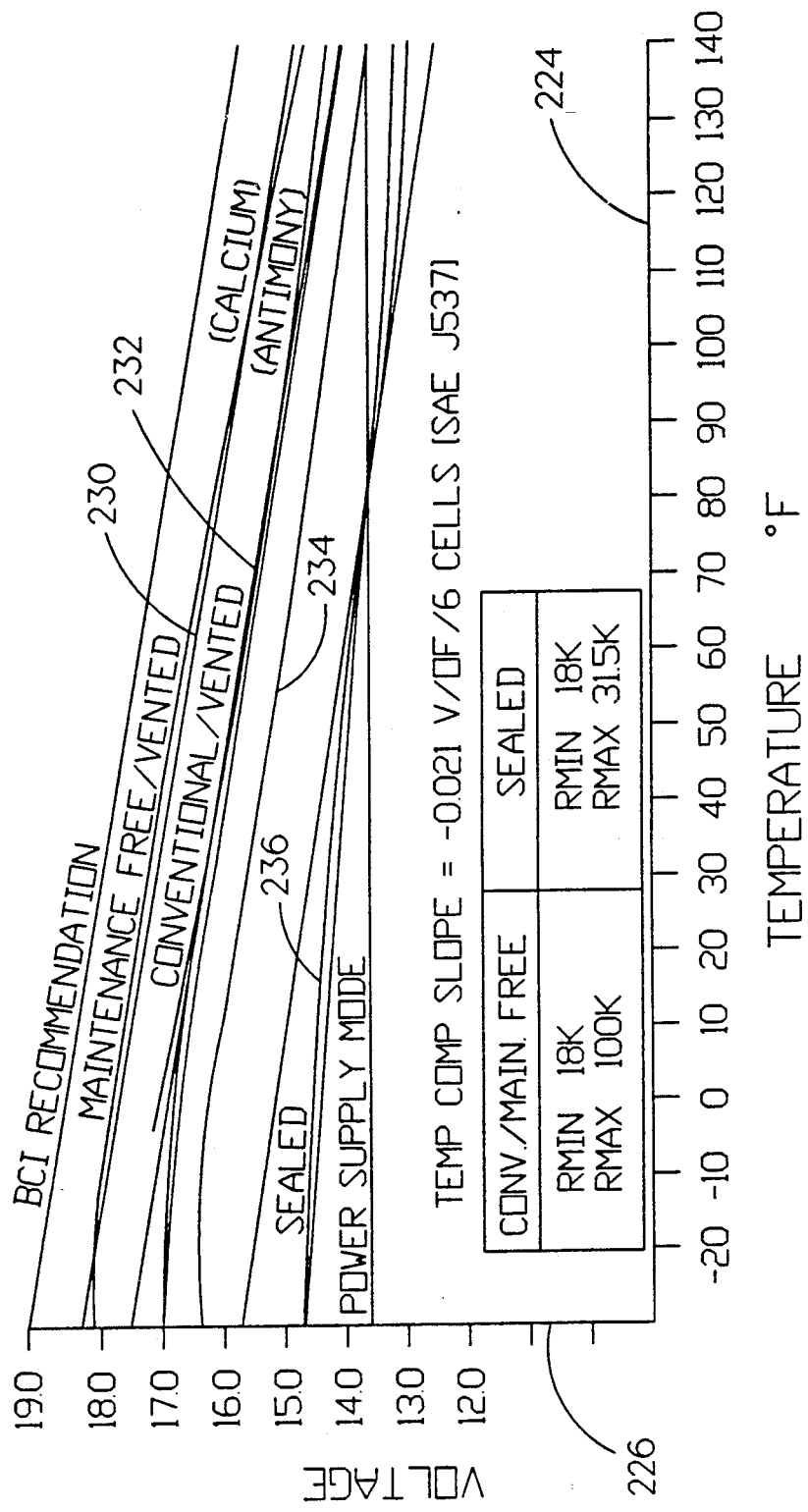
FIG. 11B shows the temperature compensation profiles for a maintenance free battery, a conventional battery, a sealed-gelled battery, and a sealed absorb battery.

Now referring to FIG. 11B which shows the various end of charge voltages for the maintenance free battery, conventional battery, sealed absorb battery and sealed-gelled battery. The plots on FIG. 6B are shown along a horizontal axis 224 indicating temperature ranging from −20° F. to +140° F. to +140° F. A vertical axis 226 shows an end of charge voltage ranging from 12 volts to 19 volts. The various end of charge voltage lines are shown for the maintenance free battery on charge line 230, for the conventional battery on end of charge line 232 for the sealed absorbed battery on end of charge line 234 and for the sealed-gelled battery on end of charge line 236. It can be seen from FIG. 11B that the low temperature end of charge voltage levels off to a predetermined voltage level and is generally higher than the end of charge voltage at the high temperature extreme for each battery type. There is a negative slope of approximately −0.021 volts per six cells per ° F. of each battery.

Figure 12:
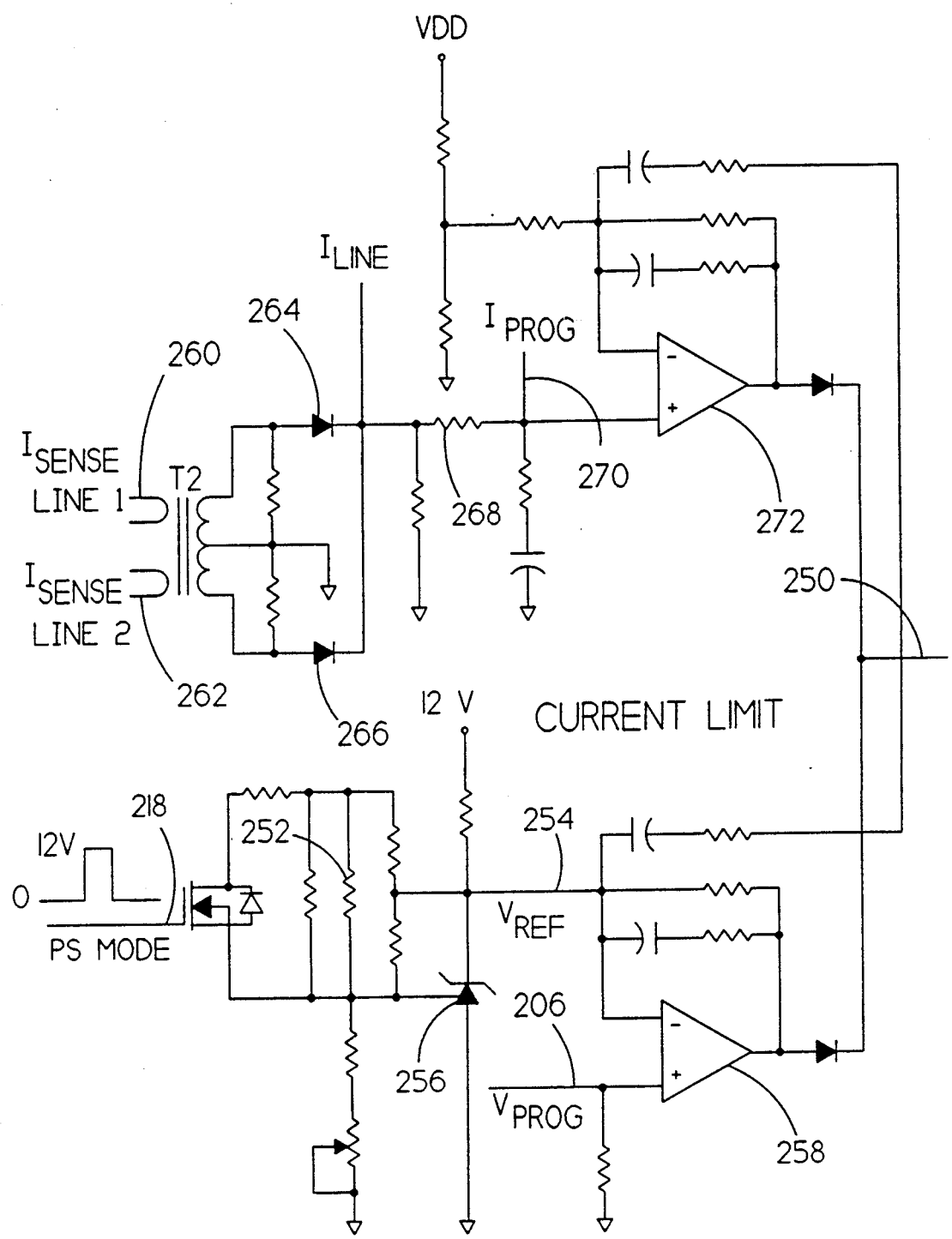
FIG. 12 shows a current limit apparatus used to limit the current of the constant voltage temperature compensated current limit and battery charger.

Now referring to FIG. 12 which shows the method and apparatus of the invention used to limit the charging current to the battery. The current limit signal 250 is the result of the output of the comparison of the supply voltage AC component current or the voltage reference voltage compared to the voltage program voltage. The circuit of FIG. 12 is controlled by the logical power supply mode select signal 218. The power supply mode select signal 218 determines whether or not a thermistor 252 will provide a temperature compensated voltage reference 254. If the power supply mode select line is active then the temperature compensation through thermistor 252 is disabled. The voltage reference signal 254 is provided with a temperature compensation component from the thermistor 252 and from a precision 5 volt reference 256. A precision 5 volt reference is independent of temperature. Thus the circuit of FIG. 12 can provide a voltage reference 254 which varies with temperature as a result of the output of the thermistor around a precise voltage reference provided by the 5 volt reference 256. The voltage reference 254 is compared against the program voltage 206 which is provided by the circuitry of FIG. 11A. The voltage reference 254 comparison is done by comparator 258 and provides one component of the current limit signal 250. The precision 5 volt reference is a temperature compensation precision band gap reference.

The sense side of the circuit provides a very precise transformer 260 to sense the AC supply line current. The charge circuit is a constant voltage temperature compensated current limited charge circuit. The current limit line 250 is provided on the other half by the output of comparator 272. The circuit of FIG. 12 provides a current limit of 27 amps. The current limiting transformer 262 has two sense lines connected to it. The first sense line is the I sense line 1, 216, the second sense line is the I sense line 2, 262. The transformer of 262 has 4000 turns on the secondary winding in one preferred embodiment of the invention. The current supply line 260 provides a primary winding for the transformer 262 that senses the supply current. Diode 264 provides a rectified version of the voltage across the secondary windings of transformer 262 which is then scaled by resistor 268. Comparator 272 provides a current limited signal to one half of the current limit signal 250.

Figure 13:
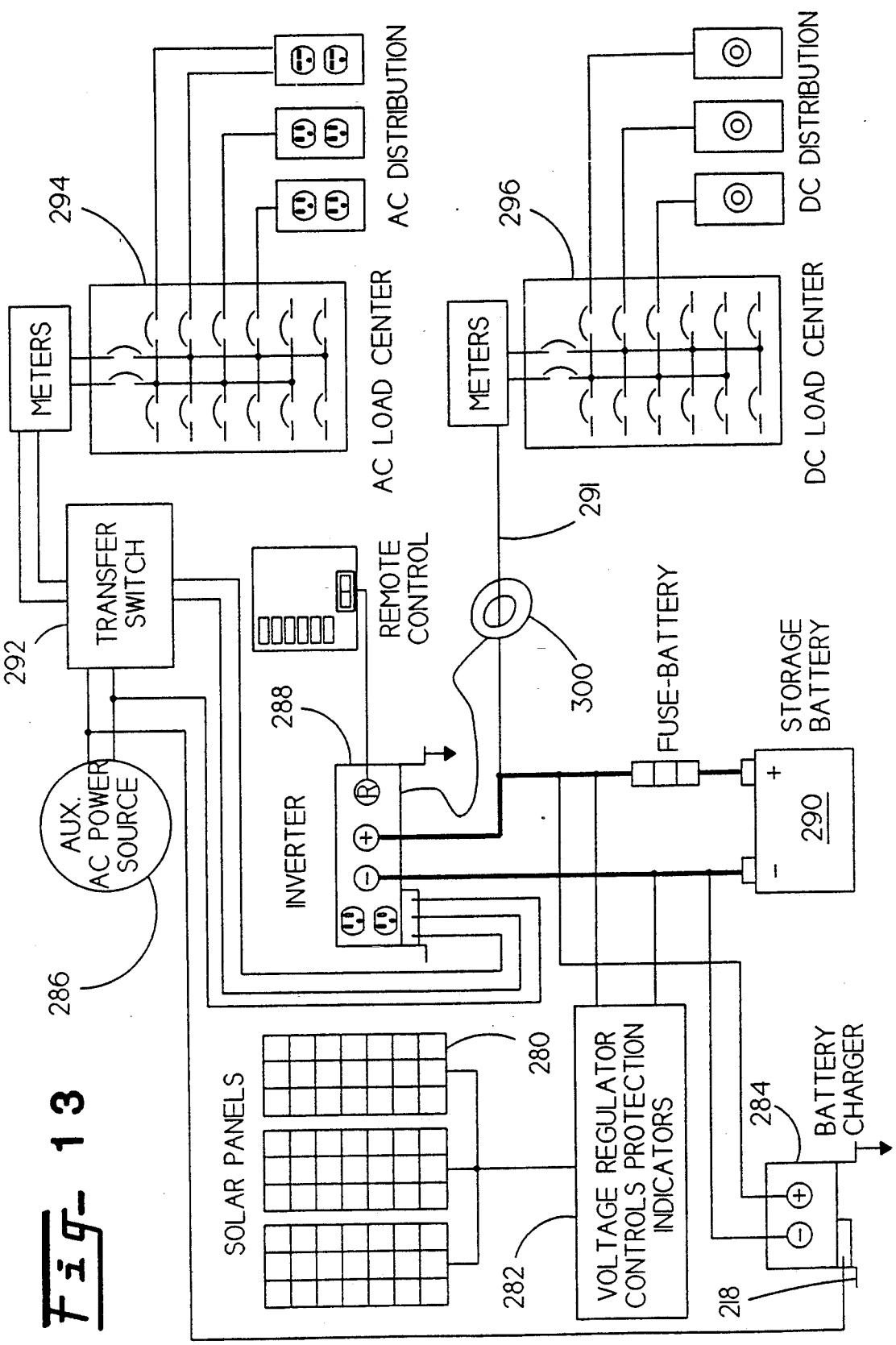
FIG. 13 shows a home heating system using the apparatus of the invention to prevent a high voltage DC power distribution line.

Now referring to FIG. 13 which shows the method and apparatus of the invention used in an example of a solar powered hybrid home. Solar panels 280 provide power through voltage regulator 282 to charge a battery 290. A battery charger 284 is included to charge the battery from an auxiliary AC power source 286. Transfer switch 292 provides power to an AC distribution center 294 through either inverter 288 or auxiliary AC power source 286 depending upon whether the battery 290 has sufficient charge. In alternative home and recreational vehicle systems a DC load center 296 may be provided which receives power from the storage 290 directly. In one preferred embodiment of the invention the line from the storage battery 291 has a DC current sensor 300 attached to it. In one preferred embodiment of the invention the DC current sensor 300 is a type of hall effect sensor. As shown in FIG. 11A the invention provides the power supply mode select line 218 which provides a power supply voltage from the battery charger 284 which does not exceed a safe DC distribution level. Thus the method of the invention provides a method of reducing the voltage from the battery charger to a safe predetermined level to prevent the end of charge voltage from being presented to devices in the DC distribution 296.

The hall effect sensor 300 will detect any DC load on DC supply line 291. When the hall effect sensor 300 sees a DC load the power supply mode select line 218 becomes active. The battery charger apparatus of the invention provides a way of continuously monitoring the battery voltage to determine whether or not the battery voltage has slipped below a predetermined threshold. The predetermined threshold is considered to be 2.1 volts per cell in one preferred embodiment of the invention.

Figure 14:
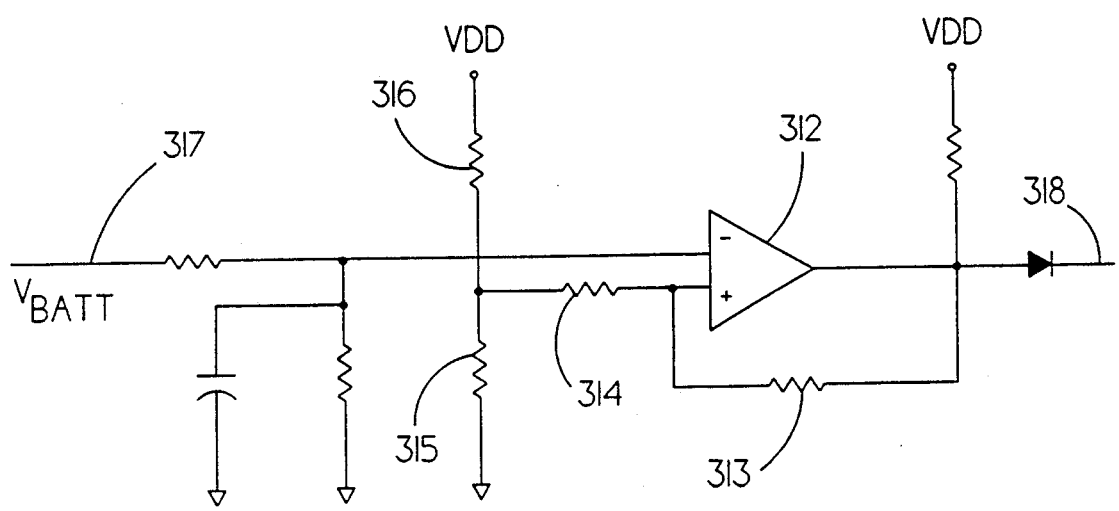
FIG. 14 shows an auto refresh circuit as employed in one embodiment of the invention.

An example of an auto refresh circuit is shown in FIG. 14 as a comparator 312 sampling the battery voltage on line 317. The battery voltage 317 is compared against a resistor network which provides a signal equal to the per cell threshold. The resistor network is shown as resistor network 313-316. The auto refresh circuitry of the invention shown in FIG. 14 provides a method of continuously monitoring the voltage of the battery and starting the circuit using the auto refresh output 318. The auto refresh signal, 318 is provided to the master reset line 174 shown in FIGS. 10A and 10B.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A gas point detection method for use in charging a battery that reaches a gassing point while being charged comprising the steps of:
   (a) measuring a charge voltage;
   (b) waiting a predetermined amount of time;
   (c) measuring a second charge voltage; and
   (d) comparing the first voltage to the second voltage and determining a gassing phase to be a predetermined amount of voltage difference over the predetermined time period.

2. The method of claim 1 wherein the predetermined time period is in a range between 20 and 30 seconds.

3. A method of claim 1 wherein the predetermined voltage difference is in a range between 90 and 400 millivolts.

4. A charging method for a battery that gasses while being charged by a battery charger including a gas point detector circuit, a charging circuit and an overcharge timer, the method comprising the steps of:
   (a) turning the battery charger on to supply charge current to the battery;
   (b) measuring the charging current;
   (c) continuing to measure the charge current until the charge current is less than a predetermined amount;
   (d) turning the charger off;
   (e) enabling the gas point detector circuit;
   (f) waiting a first predetermined amount of time for the charge circuit to reach quiescence;
   (g) taking a first voltage sample from the charging circuit;
   (h) waiting a second predetermined amount of time;
   (i) taking a second voltage sample;
   (j) comparing the first voltage sample to the second voltage sample and if the difference between the two voltages is greater than a predetermined reference voltage then determining that the gas point has been reached;
   (k) disabling the gas point detector circuit;
   (l) resetting the overcharge timer to a predetermined starting time;
   (m) starting the overcharge timer and waiting until the overcharge timer times out after a predetermined overcharge timer time period; and
   (n) turning off the charger when the overcharge timer times out.

5. The method of claim 4 further including the step of monitoring the cell voltage and turning on the battery charger when the cell voltage falls below a predetermined cell voltage value.

6. A gas point detection apparatus for detecting the gassing point of a battery having battery terminals, the apparatus comprising:
   (a) a first sample and hold connected at a first input to a first battery terminal to sample the battery voltage at a first time;
   (b) a second sample and hold connected at a first input to the first battery terminal to sample the battery voltage at a second time;

(c) a first comparator to compare the voltage of the first sample and hold from the second sample and hold having a voltage difference output; and (d) a second comparator connected to the voltage difference output, wherein the second comparator compares the voltage difference output to a predetermined reference voltage and the second comparator has a gas point detector output.

7. The apparatus of claim 6 further comprising:
(a) a charge current line;
(b) means for detecting a low current signal having a first input connected to the charge current line, the low current detection means generating a low current signal;
(c) a first timing means to measure an overcharge over an overcharge time period, the first timing means having an overcharge output and a control input wherein the first timing means also has a gate input connected to the gas point detector output;
(d) a battery charger having a control input and having charge outputs connected to the terminals of the battery;
(e) a control means to provide a DC power ON/OFF signal, the control means connected to the overcharge output such that the DC power ON/OFF signal is activated when the first timing means is activated or the gas point detector output is not activated, wherein the DC power ON/OFF signal is connected to the battery charger control input, and further wherein activation of the DC power ON/OFF signal initiates a flow of charge current to the battery from the battery charger; and
(f) means connected to the control input of the first timing means of activating the first timing means to time out when the charge mode signal line is activated, the low current signal line is activated and the gas point detector output line is activated.

8. The apparatus of claim 7 wherein the means for detecting a low current signal further has a second input connected to a predetermined reference value so as to allow sampling the charge current line and comparing it to the predetermined reference value.

9. The apparatus of claim 8 further comprising:
(a) a first counter including a 1100 millisecond timer having a sample clock input and a 1100 millisecond delayed output; and
(b) a second counter including a 25 second timer connected to the output of the 1100 millisecond timer having a 25 second delayed output;
(c) a third counter connected to the output of the 1100 millisecond counter having a first sample and hold enable output connected to a second input of the first sample and hold; and
(d) a fourth counter connected to the output of the 25 second delay counter having a second ample and hold enable output connected to a second input of the second sample and hold.

10. The apparatus of claim 9 wherein the apparatus further comprises:
(a) an automatic refresh charge circuit comprising an automatic refresh comparator means including a first input connected to the first battery terminal and a second input connected to a predetermined reference voltage, wherein the automatic refresh comparator means provides a refresh signal on a refresh output; wherein the first timing means includes a reset input connected to receive the refresh output so as to activate the first timing means which, in turn, activates the control means so as to operate the battery charger to charge the battery when the battery per cell voltage drops below a predetermined value.

11. The apparatus of claim 10 wherein the predetermined reference voltage is at least 2.1 volts per cell.

12. The apparatus of claim 7 wherein the battery terminals are connected to a DC distribution line, the apparatus further including a means for sensing DC current coupled to the DC distribution line wherein the DC current sense means provides a house load control signal.

13. The apparatus of claim 12 wherein the DC current sensing means comprises a hall effect sensor.

14. The apparatus of claim 12 further comprising:
(a) means for converting solar energy into electrical energy on a solar energy output; and
(b) means having an input coupled to the solar energy output for regulating voltage having output lines connected to the battery terminals.

15. The apparatus of claim 14 further including:
(a) an auxiliary AC power source having an output;
(b) a transfer switch having a first input coupled to the auxiliary AC power source output and having a second input;
(c) an inverter having an output coupled to the second input of the transfer switch and having a control input;
(d) the battery charger having an AC input connected to the output of the auxiliary AC power source wherein the battery charger charges the battery by drawing current from the auxiliary AC power source; and
(e) wherein the transfer switch is operated to provide AC power to a distribution center through the inverter if the battery is sufficiently charged or through the auxiliary AC power source if the battery is not sufficiently charged.

16. The apparatus of claim 7 wherein the battery charger further includes a current limit control input, the apparatus further comprising:
(a) means for selecting one of a plurality of storage battery types, the selecting means having an output providing a selected end of charge signal for the selected one battery type;
(b) means for limiting charge current having a current error input connected to the selected end of charge signal and a current error output connected to the current limit control input wherein the charge current is limited in proportion to the selected end of charge signal.

17. The apparatus of claim 16 wherein the plurality of battery types are selected from the group consisting of maintenance free, conventional, sealed-absorbed and sealed-gelled batteries.

18. The apparatus of claim 7 wherein the control means further includes watchdog timer means having a timer output connected to a second input of the control means wherein the timer output carries a time out signal and the control means responds to the timer output by operating the DC power ON/OFF signal to shut off the battery charger unless the battery charger was previously turned off.

* * * * *

UNITED STATES PATENT AND TRADEMARK OFFICE
CERTIFICATE OF CORRECTION

PATENT NO. : 5,307,001
DATED : April 26, 1994
INVENTOR(S) : Frederick D. Heavey

It is certified that error appears in the above-indentified patent and that said Letters Patent is hereby corrected as shown below:

Column 7, line 24, delete number "1.2" and replace it with --12--.
Column 9, line 2, delete the "," after word "charger".
Column 10, line 50, delete the number "26" and replace it with --526--.
Column 11, line 45, delete the phrase "which sh below".
Column 11, line 58, delete the word "a" and replace it with --an--.
Column 12, line 28, delete the word "shows" and replace it with --show--.
Column 12, line 31, delete the number "5" and replace it with --5A and 5B--.
Column 12, line 32, delete the number "FIG. 10" and replace it with --FIGS. 10A and 10B--.
Column 12, line 60, delete the number "12" and replace it with --120--.
Column 13, line 20, delete the word "is".
Column 13, line 29, delete the number "100-%" and replace it with --100%--.

Signed and Sealed this

Twenty-third Day of May, 1995

BRUCE LEHMAN

Attest:

Attesting Officer

Commissioner of Patents and Trademarks